US012793293B2

(12) United States Patent
Tegzes et al.

(10) Patent No.: US 12,793,293 B2
(45) Date of Patent: Nov. 10, 2026

(54) METHOD FOR POST-PROCESSING DETECTED TUBES AND LINES IN MEDICAL IMAGES

(71) Applicant: GE Precision Healthcare LLC, Waukesha, WI (US)

(72) Inventors: Pál Tegzes, Budapest (HU); Hongxu Yang, Helmond (NL); Zoltán Kiss, Budapest (HU); Balázs Péter Cziria, Budapest (HU); Zita Herczeg, Szeged (HU); Poonam Dalal, Waukesha, WI (US); Lehel Mihály Ferenczi, Budapest (HU); Gopal Avinash, San Ramon, CA (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 128 days.

(21) Appl. No.: 18/783,214

(22) Filed: Jul. 24, 2024

(65) Prior Publication Data

US 2026/0030802 A1 Jan. 29, 2026

(51) Int. Cl.

*G06T 11/23* (2026.01)
*G06T 7/12* (2017.01)
*G06T 7/64* (2017.01)

(52) U.S. Cl.

CPC ................ *G06T 11/23* (2026.01); *G06T 7/12* (2017.01); *G06T 7/64* (2017.01); *G06T 2207/10116* (2013.01); *G06T 2207/30021* (2013.01); *G06T 2210/41* (2013.01)

(58) Field of Classification Search

CPC ... G06T 11/23; G06T 7/64; G06T 7/12; G06T 2207/10116; G06T 2207/30021; G06T 2210/41

See application file for complete search history.

(56) References Cited

U.S. PATENT DOCUMENTS

| | | | | |
|---|---|---|---|---|
| 11,140,341 | B2 | 10/2021 | Dou et al. | |
| 2018/0005373 | A1* | 1/2018 | Rosado-Toro | G06T 7/11 |
| 2019/0164291 | A1* | 5/2019 | Wang | G06V 10/50 |

(Continued)

FOREIGN PATENT DOCUMENTS

CN 109359602 B 2/2021

OTHER PUBLICATIONS

Sun, Y., "Automated identification of vessel contours in coronary arteriograms by an adaptive tracking algorithm," IEEE Transactions on Medical Imaging, vol. 8, No. 1, Mar. 1989, 11 pages.

(Continued)

*Primary Examiner* — Michelle Chin

(74) *Attorney, Agent, or Firm* — McCoy Russell LLP

(57) ABSTRACT

A medical tube-tracing method is described herein, where a curve is fitted to pixels of a binary segmentation mask representing a medical tube in an X-ray image. The curve may then be used to generate a more precise and realistic representation of the medical tube in the X-ray image. A location of the tube may be saved as a set of coordinates, which may reduce an amount of processing and computation performed by software applications to display the medical tube in the x-ray image, and provide the software applications more freedom and flexibility in displaying the medical tube.

20 Claims, 19 Drawing Sheets

(56) References Cited

U.S. PATENT DOCUMENTS

| | | | | |
|---|---|---|---|---|
| 2020/0167928 A1* | 5/2020 | Heindl | .................. | G06T 7/0012 |
| 2022/0022818 A1* | 1/2022 | Ghesu | .................. | A61B 5/7275 |

OTHER PUBLICATIONS

Sun, Y-N. et al., "The computer image analysis for the 2-D coronary arteriograms," Proceedings of TENCON '93, IEEE Region 10 International Conference on Computers, Communications and Automation, Oct. 19, 1993, Beijing, China, 5 pages.
Wink, O. et al., "Fast delineation and visualization of vessels in 3-D angiographic images," IEEE Transactions on Medical Imaging, vol. 19, No. 4, Apr. 2000, 10 pages.
Hernàndez Hoyos, M. et al., "A Deformable Vessel Model with Single Point Initialization for Segmentation, Quantification, and Visualization of Blood Vessels in 3D MRA," Proceedings of the Medical Image Computing and Computer-Assisted Intervention—MICCAI 2000, Oct. 11, 2000, Pittsburgh, PA, 11 pages.
Hernàndez Hoyos, M. et al., "Assessment of carotid artery stenoses in 3D contrast-enhanced magnetic resonance angiography, based on improved generation of the centerline," Machine Graphics & Vision International Journal, vol. 14, No. 4, May 23, 2006, 28 pages.
ISA European Patent Office, International Search Report and Written Opinion Issued in Application No. PCT/US2025/036494, Sep. 29, 2025, WIPO, 19 pages.
Papalazarou, C. et al., "Sparse-plus-dense-RANSAC for estimation of multiple complex curvilinear models in 2D and 3D," Pattern Recognition, vol. 46, No. 3, Mar. 2013,.
Ambrosini, P. et al., "Fully Automatic and Real-Time Catheter Segmentation in X-Ray Fluoroscopy," ArXiv Cornell University Website, Available Online at https://arxiv.org/abs/1707.05137, Available as Early as Jul. 17, 2017, 8 pages.
Tian, Y. et al., "Object localization via evaluation multi-task learning," Neurocomputing, vol. 253, Aug. 30, 2017, 24 pages.
"Measurement Tools For Curve Image," Curve Dental Website, Available Online at https://www.curvedental.com/blog/measurement-tools-for-curve-image, Sep. 5, 2018, 7 pages.
Yang, H. et al., "Catheter localization in 3D ultrasound using voxel-of-interest-based ConvNets for cardiac intervention," International Journal of Computer Assisted Radiology and Surgery, vol. 14, Apr. 9, 2019, 9 pages.
Zhang, R. et al., "MRLN: Multi-Task Relational Learning Network for MRI Vertebral Localization, Identification, and Segmentation," IEEE Journal of Biomedical and Health Informatics, vol. 24, No. 10, Oct. 2020, Available Online Jan. 23, 2020, 10 pages.
Riad, R. et al., "Radiological Measurement of the Femoral Head Diameter: Male-Female Variations and Relationships with the Stature in Adult Bengali Bangladeshis," Annals of International Medical and Dental Research, vol. 7, No. 2, 2021, 5 pages.
Zhou, Y. et al.,. "Multi-task learning for segmentation and classification of tumors in 3D automated breast ultrasound images," Medical Image Analysis, vol. 70, May 2021, 17 pages.
Tegez, P. et al., "Display Screen With Computer Generated Markings for Visualizing Placement of an Enteric Tube or Line on a Medical Image," U.S. Design U.S. Appl. No. 29/816,746, filed Nov. 24, 2021, 12 pages.
Park, K. et al., "The Comparison of Lower Extremity Length and Angle between Computed Radiography-Based Teleoroentgenogram and EOS® Imaging System," Diagnostics, vol. 12, No. 5, Apr. 22, 2022, 8 pages.
"Critical Care Suite on-device AI," GEH Healthcare Website, Available Online at https://www.gehealthcare.com/products/radiography/critical-care-suite, Available as Early as May 17, 2023, 10 pages.
Maeda, Y. et al., Automatic measurement of the Cobb angle for adolescent idiopathic scoliosis using convolutional neural network, Nature, vol. 13, No. 14576, Sep. 4, 2023, 9 pages.

* cited by examiner

1700

METHOD FOR POST-PROCESSING DETECTED TUBES AND LINES IN MEDICAL IMAGES

FIELD

The subject matter disclosed herein relates to medical image processing, and more particularly to systems and methods for visualizing placement of a medical tube or line.

BACKGROUND

Medical imaging may be utilized to visualize medically placed tubes or lines (e.g., chest tube, a nasogastric tube, endotracheal tube, vascular line, a peripherally inserted central catheter (PICC), a catheter, etc.). However, it may be difficult for medical personnel (e.g., doctor, radiologist, technician, etc.) to visualize these medically placed tubes or lines. In addition, the medical personnel may be untrained or inexperienced, which may hinder their ability to identify the medically placed tube or line and to determine if it is properly placed. Further, medical personnel may have to manually make measurements (which may be time consuming) to determine if a medically placed tube or line is properly placed.

BRIEF DESCRIPTION

In one embodiment, a method comprises receiving a binary segmentation mask of an X-ray image, the binary segmentation mask including a set of positive pixels corresponding to a location of a medical tube in the X-ray image, and a set of negative pixels corresponding to portions of the X-ray image not including the medical tube; iteratively adding points along a trajectory of the positive pixels in the binary segmentation mask to form a polyline, each point forming a node of the polyline; generating a representation of the medical tube based on the polyline; and displaying the representation superimposed on the X-ray image on a display device.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
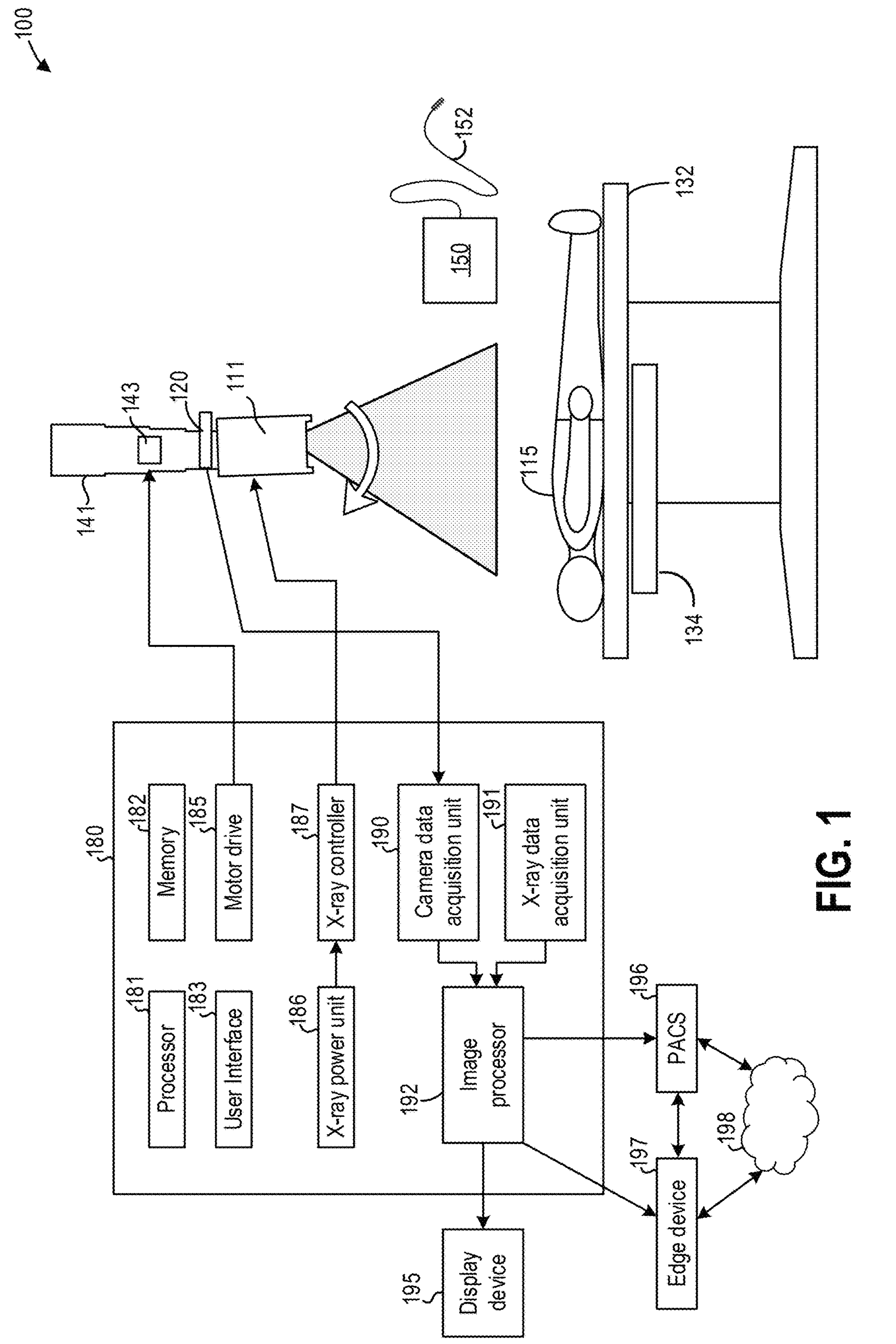
FIG. 1 shows an example x-ray imaging system, in accordance with one or more embodiments of the present disclosure.

Imaging devices (e.g., gamma camera, positron emission tomography (PET) scanner, computed tomography (CT) scanner, X-Ray machine, fluoroscopy machine, magnetic resonance (MR) imaging machine, ultrasound scanner, etc.) generate medical images (e.g., native Digital Imaging and Communications in Medicine (DICOM) images) representative of the parts of the body (e.g., organs, tissues, etc.) to diagnose and/or treat diseases. Medical images may include volumetric data including voxels associated with the part of the body captured in the medical image. Medical image visualization software allows a clinician to segment, annotate, measure, and/or report functional or anatomical characteristics on various locations of a medical image. In some examples, a clinician may utilize the medical image visualization software to identify regions of interest with the medical image.

Clinical development has undergone a transformation in recent years due to the convergence of digital data sources and the efficient use of artificial intelligence (AI) as well as machine-learning models to identify clinically meaningful patterns in data. AI programs have been developed and applied to practices such as diagnosis processes, protocol development, drug development, personalized medicine, and patient monitoring/care. For example, AI can learn features from a large volume of healthcare data, and then use the obtained insights to assist clinical practices in treatment design or risk assessment.

More specifically, AI models have demonstrated remarkable progress in radiological image recognition tasks. Historically, radiological medical images have been visually assessed by trained medical professionals for the detection, characterization, and monitoring of diseases. However, as there is a desire for greater efficacy and efficiency in clinical care and AI methods excel at automatically recognizing complex patterns in imaging data, the use of AI in the identification and characterization of radiographic characteristics is becoming increasingly prevalent.

In particular, a machine learning (ML) and/or other deep learning (DL) model may detect, segment, and analyze a presence of a medical device (e.g., medically placed tube or line). For example, the ML/DL model may detect an end of a medically placed tube or line, detect a reference or anatomical landmark, determine a position of the medically placed tube or line relative to the reference or anatomical landmark, measure a distance between the end of the medically placed tube or line and the reference landmark, and determine whether the tube or line is properly placed.

As one example, a nasogastric tube may be inserted into a nose of a patient and directed down an esophagus to a stomach of the patient. The tube may be subsequently visualized in an x-ray image generated via an x-ray imaging system. To aid medical personnel in visualizing the tube, an AI segmentation model may be used to detect and segment the nasogastric tube within the x-ray image. The tube may be detected by the AI segmentation model, which may output a binary segmentation mask of a same size as the x-ray image, where the tube is represented by white pixels over black background. That is, the binary segmentation mask may depict pixels of the tube (e.g., positive pixels) in white, and pixels not included in the tube (e.g., negative pixels) in black. The binary segmentation mask may be used to draw or superimpose a representation of the tube on the x-ray image.

However, the representation of the tube in the x-ray image may not include precise boundaries, due to the pixelated nature of the binary segmentation mask. Additionally, measurements of the tube made using the mask may be imprecise and computationally inefficient. For example, it may be desirable to measure a distance along the tube from a diaphragm of the patient to a top of the tube, or from the diaphragm to a port of the patient. One method for measuring a length of a portion of the tube includes counting a total number of pixels in an area corresponding to the portion of the tube in the mask, dividing by a thickness of the tube, and multiplying by a size of each pixel. However, such a calculation may be computationally intensive, and may not result in a precise measurement. In particular, small variations in the thickness of the detected tube, or portions of the tube overlapping itself may introduce inaccuracies to a measurement of the tube length by counting the positive pixels. In addition, in case the detected mask includes unclean regions due to false positive and false negative pixels, then the displayed measurement may be difficult for the user to interpret.

To address this issue, a medical tube-tracing method is described herein, where during a post-processing of the binary segmentation mask, center points of the positive pixels are identified, and a curve is calculated based on the points. The curve may then be used to generate a representation of the medical tube in the x-ray image, where the representation has more precise borders than an alternative representation generated from the positive pixels. Additionally, the curve-based representation has several other advantages over the alternative representation. The tube may be drawn with a fixed thickness, or according to an arbitrary graphical design. A location of the tube may be saved as a set of coordinates, which may reduce an amount of processing and computation performed by software applications to display the medical tube in the x-ray image, and provide the software applications more freedom and flexibility in displaying the medical tube. By reducing the amount of processing, a combined display of the tube and the x-ray image may be generated more rapidly and with less delay, reducing an amount of use of the x-ray imaging system and an amount of time of the x-ray imaging system spent on the patient, and increasing a throughput of the x-ray imaging system (e.g., a number of patients that may be scanned using the x-ray imaging system in a daily operating shift).

Further, the curve-based representation may facilitate more efficient and accurate measurement of the medical tube and/or sections of the medical tube. Rather than performing the computationally intensive procedure described above, portions of the medical tube may be efficiently and accurately measured by adding lengths of a number of line segments of the tube corresponding to the portions, and resulting measurements may be more easily and clearly interpreted. Additionally, by not counting the total number of pixels in the area corresponding to the portion of the tube to be measured in the mask, dividing by the thickness of the tube, and multiplying by the size of each pixel, an amount of computation performed by the tube-tracing algorithm may be reduced, further increasing the performance and throughput of the x-ray system.

Turning now to FIG. 1, a block diagram of an x-ray imaging system 100 in accordance with an embodiment is shown. The x-ray imaging system 100 includes an x-ray source 111 which radiates x-rays, a bed 132 upon which a subject 115 is placed during an examination, and an x-ray detector 134 for detecting x-rays radiated by the x-ray source 111 and attenuated by the subject 115. The x-ray detector 134 may comprise, as non-limiting examples, a scintillator, one or more ion chamber(s), a light detector array, an x-ray exposure monitor, an electric substrate, and so on. The x-ray detector 134 may be configured so as to be horizontally moveable according to an imaged region of the subject.

The operation console 180 comprises a processor 181, a memory 182, a user interface 183, a motor drive 185 for controlling one or more motors 143, an x-ray power unit 186, an x-ray controller 187, a camera data acquisition unit 190, an x-ray data acquisition unit 191, and an image processor 192. X-ray image data transmitted from the x-ray detector 134 is received by the x-ray data acquisition unit 191. The collected x-ray image data are image-processed by the image processor 192. A display device 195 communicatively coupled to the operating console 180 displays an image-processed x-ray image thereon.

The x-ray source 111 is supported by a support post 141 which may be mounted to a ceiling (e.g., as depicted) or mounted on a moveable stand for positioning within an imaging room. The x-ray source 111 is horizontally moveable relative to the subject or patient 115. For example, one of the one or more motors 143 may be integrated into the support post 141 and may be configured to adjust a horizontal position of the x-ray source 111. To that end, the motor drive 185 of the operation console 180 may be communicatively coupled to the one or more motors 143 and configured to control the one or more motors 143.

The x-ray power unit 186 and the x-ray controller 187 supply power of a suitable voltage current to the x-ray source 111. A collimator (not shown) may be fixed to the x-ray source 111 for designating an irradiated field-of-view of an x-ray beam. The x-ray beam radiated from the x-ray source 111 is applied onto the subject via the collimator.

A camera 120 may be positioned adjacent to the x-ray source 111 and may be co-calibrated with the x-ray source 111. The x-ray source 111 and the camera 120 may pivot or rotate relative to the support post 141 in an angular direction to image different portions of the subject 115. The camera 120 may comprise an optical camera that detects electromagnetic radiation in the optical range. Additionally or alternatively, the camera 120 may comprise a depth camera or range imaging camera. As an illustrative and non-limiting example, the camera 120 configured as a depth camera may include an optical camera, an infrared camera, and an infrared projector which projects infrared dots in the field-of-view of the camera 120. The infrared camera images the dots, which in turn may be used to measure depth within the optical camera of the camera 120. As another illustrative and non-limiting example, the camera 120 may comprise a time-of-flight camera. The camera 120 is communicatively coupled to the camera data acquisition unit 190 of the operation console 180. Camera data acquired or generated by the camera 120 may thus be transmitted to the camera data acquisition unit 190, which in turn provides acquired camera image data to the image processor 192 for image processing. For example, as described further herein, the image processor 192 may process the acquired camera images to identify a position of a desired anatomical region for imaging and/or to measure or estimate the thickness of the subject 115 at the desired anatomical region. In some examples, console 180 and/or PACS 196 may include a report module configured to identify and annotate radiological findings in acquired x-ray images (e.g. based on the radiology report using natural language processing (NLP)). Image processor 192 may send processed images to an edge device 197 and/or a picture archiving and communication system (PACS) 196 to which image processor 192 is communicatively coupled. Edge device 197 may be an edge processing device, a cloud processing device, or an extra computing device coupled to a network 198. Further, network 198 may be communicatively coupled with PACS 196 so image data may be transferred between network 198, PACS 196, and/or edge device 197.

In some cases, a medical tube or line 152 of an interventional system 150, such as a chest tube, a nasogastric tube, endotracheal tube, vascular line, a peripherally inserted central catheter (PICC), a catheter, or a different tube or line may be placed within a body of patient 115. For example, interventional system 150 may be a nasogastric system, and a nasogastric tube may be inserted into a nose of patient 115 and directed down an esophagus to a stomach of patient 115. Medical tube 152 may be subsequently visualized in an x-ray image generated using x-ray imaging system 100. However, it may be difficult for medical personnel (e.g., doctor, radiologist, technician, etc.) to visualize these medically placed tubes or lines. To aid the medical personnel, one or more AI algorithms may be used to represent medical tube 152 in the x-ray image, as described in reference to FIGS. 2-15.

For example, an AI segmentation model may be used to detect and segment medical tube 152 within the x-ray image. The AI segmentation model may take the x-ray image as input, and output a binary segmentation mask, where medical tube 152 is represented by white pixels (positive pixels) over a black background (negative pixels). To increase a clarity and precision of the display of medical tube 152 in the x-ray image, a second AI model may perform post-processing on the binary segmentation mask, to replace the positive pixels of the binary segmentation mask with a representation of medical tube 152 based on a smooth curve fitted to center points of the positive pixels. The representation based on the smooth curve may be displayed on the x-ray image in a less computationally intensive manner, and with more flexibility with respect to the display. The curve-based representation may have more precise and accurate borders, which may increase an accuracy of the visualization of medical tube 152 within the x-ray image. Additionally, the representation based on the smooth curve may facilitate more computationally efficient and accurate measurement of a length of medical tube 152, or one or more sections of medical tube 152. An accurate measurement of the tube length can help doctors to estimate the placement of the tube in the image, to reduce a risk of having to re-insert the tube. Additionally, tube placement medical guidelines may include requirements about the length of tube portions, such as that at least 10 cm of the nasogastric tube should be positioned beyond the gastroesophageal junction. Therefore, an accurate measurement along the tube may facilitate the assessment of the tube position.

Figure 2:
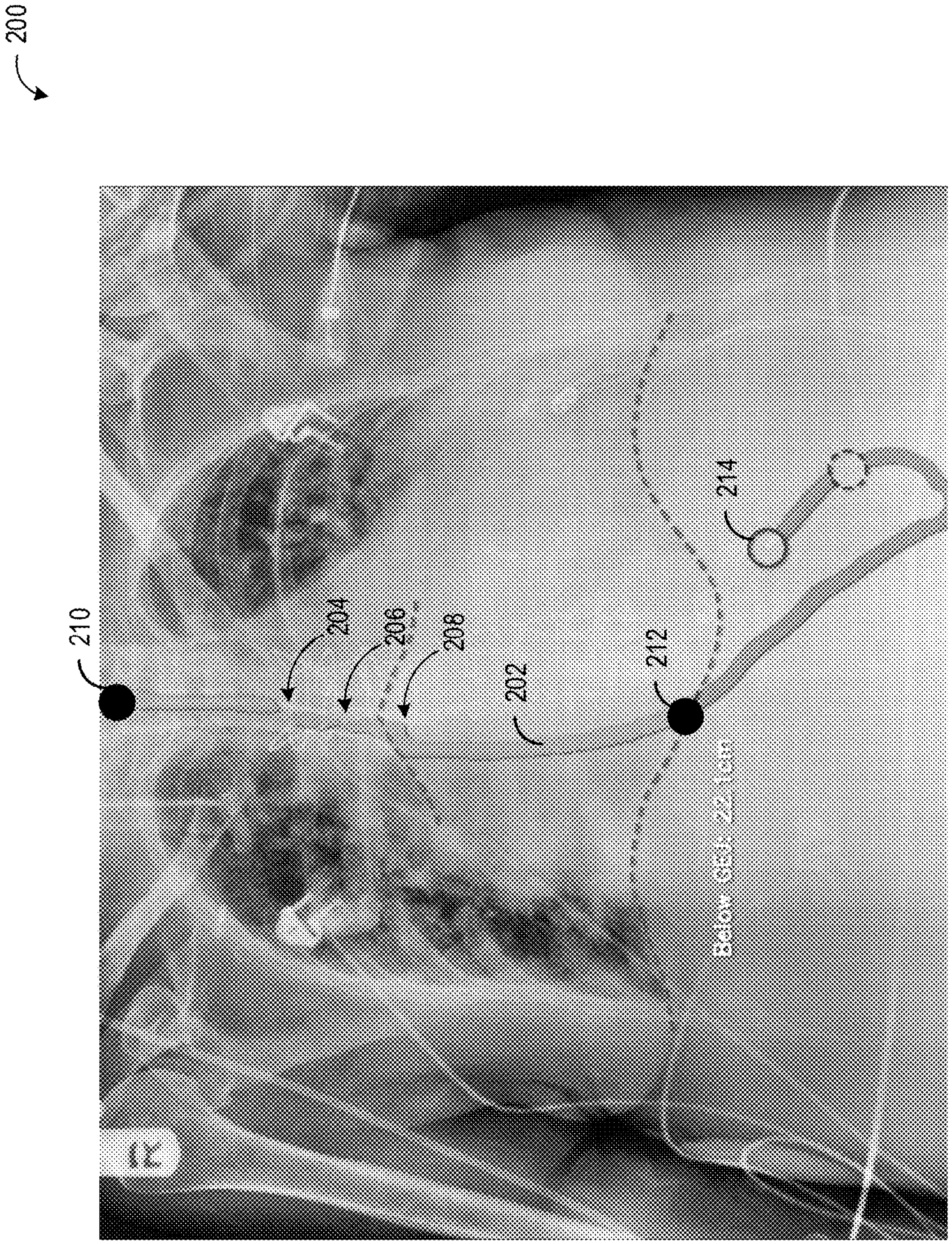
FIG. 2 (Prior art)
FIG. 2 shows an exemplary x-ray image on which a first representation of a medical tube is superimposed, as prior art.

As an example, FIG. 2 shows an exemplary x-ray image 200, where a nasogastric tube 202 is superimposed on x-ray image 200. Nasogastric tube 202 is generated from a binary segmentation mask, and as a result, an outline of nasogastric tube 202 is rough in sections and includes some irregularities or artifacts generated by the binary segmentation process that distort an appearance of nasogastric tube 202. For example, a gap 204 is seen in a portion of nasogastric tube 202; a width of a section 206 of nasogastric tube 202 is smaller than other portions of nasogastric tube 202; and a protruding portion 208 of nasogastric tube 202 distorts an appearance of nasogastric tube 202. These irregular features may complicate performing measurements of nasogastric tube 202. For example, a measurement algorithm for measuring a distance along nasogastric tube 202 from a top point 210 to a diaphragm point 212 of nasogastric tube 202, or to a port 214 of the patient, may rely on a pixel count of pixels included in nasogastric tube 202, where extra pixels at protruding portion 208 and/or missing pixels at gap 204 and section 206 may reduce an accuracy of the measurements.

Figure 3:
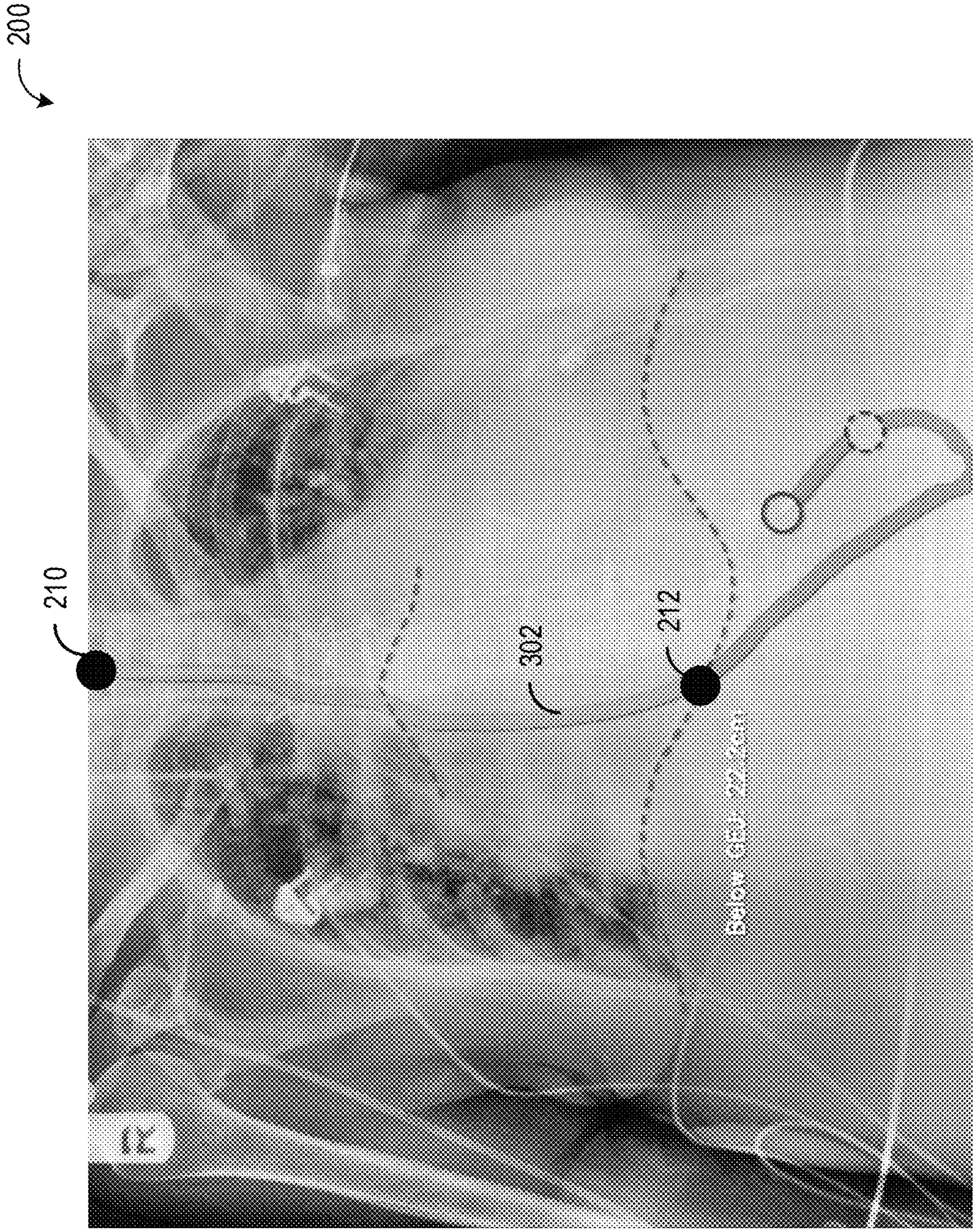
FIG. 3 shows an exemplary x-ray image on which a second representation of a medical tube is superimposed in accordance with one or more embodiments of the present disclosure.

In contrast, FIG. 3 shows exemplary x-ray image 200, where a nasogastric tube 302 is superimposed on x-ray image 200. Nasogastric tube 302 is generated by an algorithm that takes as input the binary segmentation mask of FIG. 2, fits a curve to the positive pixels of the binary segmentation mask, and outputs a second mask including a line of constant thickness representing nasogastric tube 302 that follows the curve. In FIG. 3, an outline of nasogastric tube 302 is more clearly delineated than an outline of nasogastric tube 202, where the outline of nasogastric tube 302 does not include gaps, protruding portions, or sections with varying widths that may distort an appearance of the tube in x-ray image 200. In contrast to nasogastric tube 202, a distance from top point 210 to diaphragm point 212 of nasogastric tube 302 may be measured in a computationally simple and efficient manner, based on the fixed distances between reference points used to generate nasogastric tube 302. Nasogastric tube 302 may be generated by the AI algorithm in accordance with the method described in FIG. 4.

Figure 4:
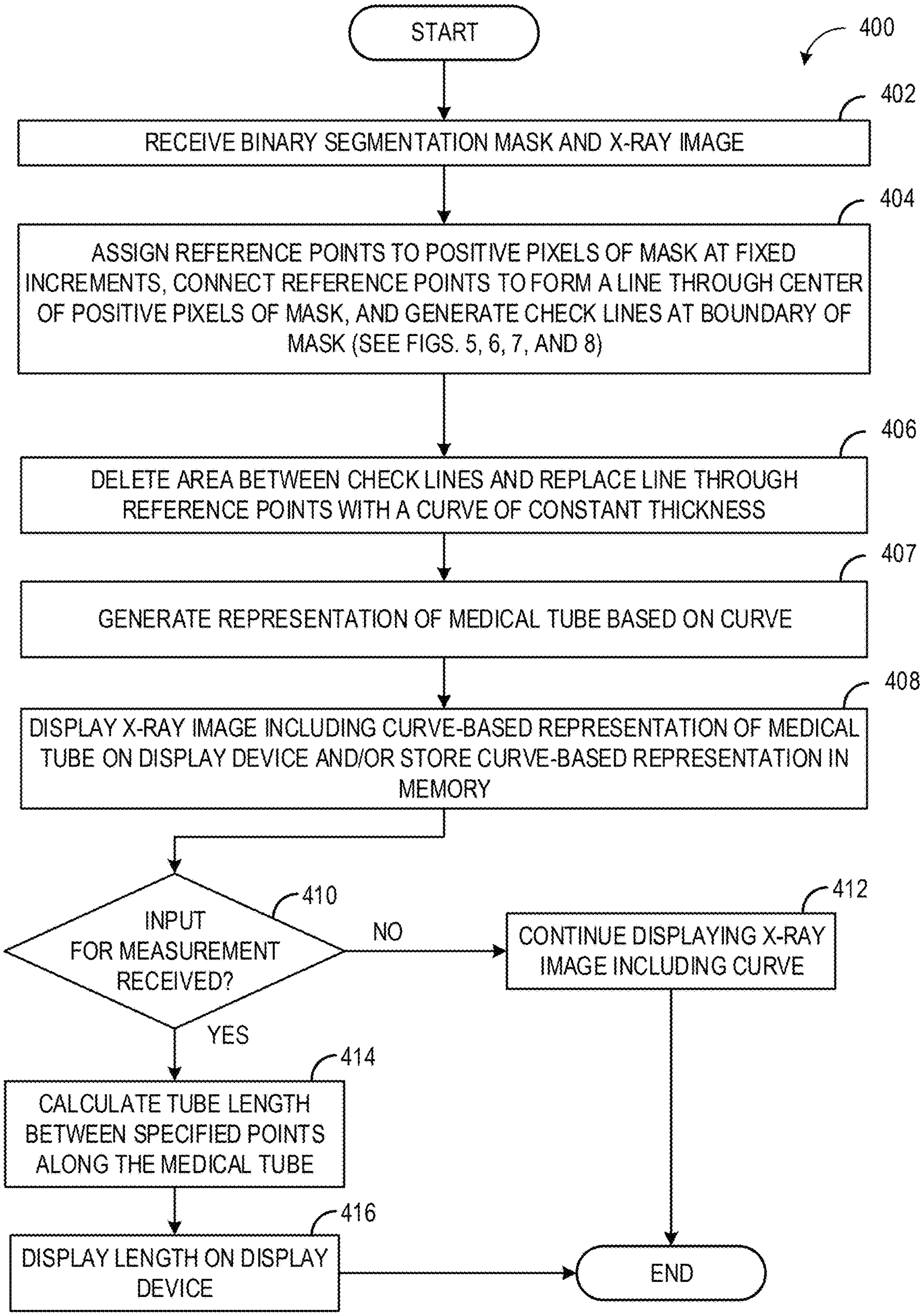
FIG. 4 is a flowchart illustrating a high-level method for displaying a medical tube superimposed on an x-ray image, in accordance with one or more embodiments of the present disclosure.

Referring now to FIG. 4, a high-level method 400 is shown for tracing a medical tube (or line) in an x-ray image. More specifically, method 400 may generate a representation of the medical tube in an x-ray image, where the representation is based on fitting a curve to a binary segmentation mask of the medical tube. By representing the medical tube as a line rather than a collection of pixels described by the mask, the medical tube may be more precisely superimposed on the x-ray image, and measurements of the medical tube may be made more accurately and via a simpler, less computationally intensive procedure. Method 400 and other methods described herein may be performed by an image processor of an imaging system, such as image processor 192 of x-ray imaging system 100 of FIG. 1. Specifically, method 400 and the other methods described herein may be executed by a processor of the x-ray imaging system (e.g., processor 181) based on instructions stored in a memory of the x-ray imaging system (e.g., memory 182) or in the image processor. In some examples, one or more steps of method 400 and the other methods described herein may be performed by or in conjunction with instructions stored in the memory associated with a software program for displaying medical images to a user, such as a radiologist.

Method 400 begins at 402, where method 400 includes receiving a binary segmentation mask of the medical tube, and an x-ray image from which the binary segmentation mask was created. In various embodiments, the binary segmentation mask may be created by an AI segmentation model, in accordance with techniques well known in the art. The binary segmentation mask may include a first set of positive pixels corresponding to image data of the x-ray image corresponding to the medical tube, and a second set of negative pixels corresponding to image data of the x-ray image not corresponding to the medical tube. In various examples, the positive pixels may be represented as white pixels, and the negative pixels may be represented as black pixels.

Figure 17:
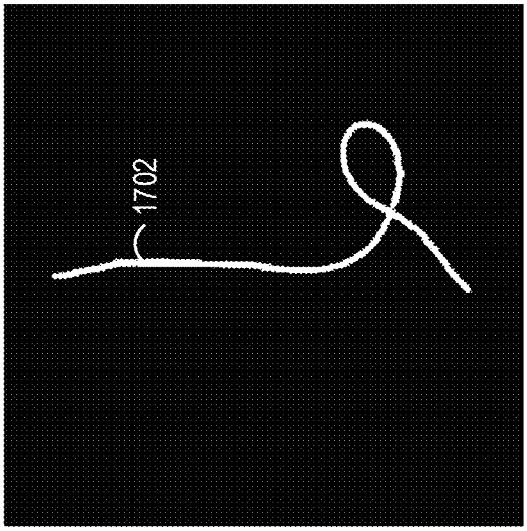
FIG. 17 (Prior art)
FIG. 17 is a mask of an x-ray image including set of pixels representing a medical tube highlighted in white, as prior art.

As an example, FIG. 17 shows an exemplary binary segmentation mask 1700, where white pixels of binary segmentation mask 1700 correspond to positive pixels where a medical tube 1702 was detected in an x-ray image of a same size as binary segmentation mask 1700, and black pixels correspond to negative pixels where no parts of medical tube 1702 was detected in the x-ray image. Because medical tube 1702 is represented by a set of pixels, a boundary between the positive pixels and the negative pixels appears rough and imprecise.

Returning to FIG. 4, at 404, method 400 includes assigning reference points to the positive pixels of the binary segmentation mask at fixed incremental distances, and then connecting the reference points to trace a line through a center portion of the positive pixels. Additionally, boundary check lines (also referred to herein as check lines) may also be determined based on the line and/or borders detected between the positive pixels and the negative pixels on either side of the positive pixels. The check lines may be used to identify areas where the medical tube may be looped and may appear to intersect with itself, as described in greater detail below. Assigning the reference points and generating the check lines is described below in reference to FIGS. 5-8.

Figure 18:
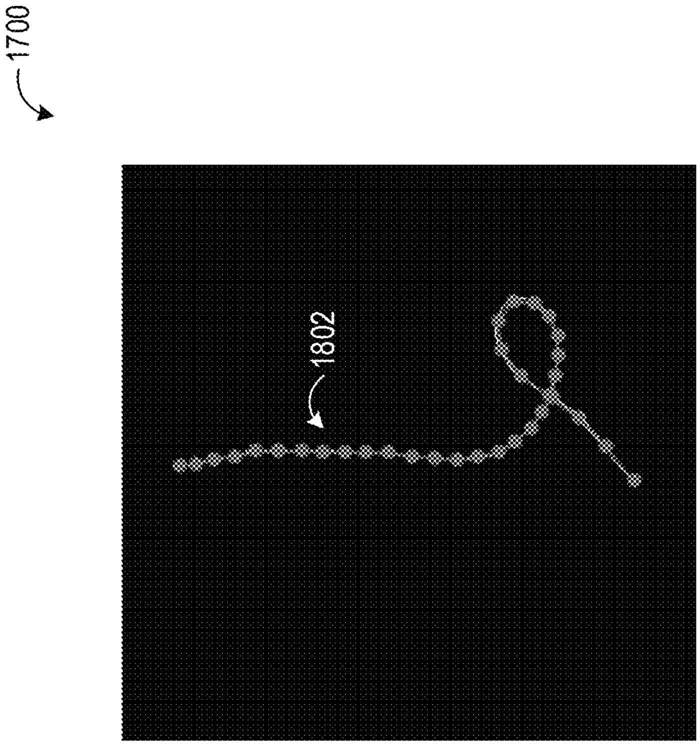
FIG. 18 is a mask of an x-ray image including set of pixels representing a medical tube highlighted in white, with a line drawn through center points of the set of pixels, in accordance with one or more embodiments of the present disclosure.

At 406, method 400 includes deleting an area of the binary segmentation mask between the check lines, to eliminate the positive pixels, leaving the line connecting the reference points. As an example, FIG. 18 shows binary segmentation mask 1700 of FIG. 17 with an exemplary line 1802 drawn in that traces a center of the positive pixels of binary segmentation mask 1700. The line connecting the reference points may then be replaced with a curved line of a constant thickness centered on line 1802, which represents the medical tube, as shown in FIG. 3 above. The thickness of the curved line may be based on a width of a portion of positive pixels of the binary segmentation mask.

In some embodiments, the binary segmentation mask may be retained and the curved line representing the tube may be drawn into the mask, as described above. In other embodiments, the traced tube representation may be drawn over an empty background, to generate a new mask that may be applied to the X-ray image. In other embodiments, a hybrid approach may be taken, where the traced tube representation may be redrawn in the binary segmentation mask until a first intersection. After the first intersection, the traced tube representation may be drawn on top of the existing tube in the X-ray image. In one embodiment, a tube width w and a clean width W may be defined. At each step, a check for positive pixels is performed on the left and right edge of the area of thickness W. If the edges are clean, positive pixels within the range W may be removed, and then a line may be drawn in with thickness w. If the edges are not clean, it may be inferred that an intersection has been reached, and the search for positive pixels may be stopped. In other embodiments, the tube may be deleted in the X-ray image and redrawn along the traced tube representation.

At 407, method 400 includes generating a representation of the medical tube based on the curved line of constant thickness. Generating the representation may include adjusting a shading, coloring, transparency, and/or otherwise embellishing portions of the curved line to accentuate, enhance, or adjust the representation to make the medical tube appear more realistic. The constant thickness may be adjusted, for example, based on a configurable parameter, which may be set by a user. For example, the constant thickness may be adjusted based on a type of medical tube being modeled, or a preference of a user. In some embodiments, the curved-line representation may be displayed in accordance with a graphical design stored in a configuration file of the x-ray imaging system. In this way, the curved-line representation may be customized to a type of procedure, the user, the patient, the healthcare facility, etc.

At 408, method 400 includes displaying the x-ray image with the curved-line representation of the medical tube on a display device and/or storing the x-ray image in a memory of the imaging system. The user may view the curved-line representation, which may be superimposed on the x-ray image. In various embodiments, the user may interact with the curved-line representation via one or more interactions permitted by the x-ray imaging system. For example, the user may select portions of the curved-line representation and adjust an appearance of the portions, select points on the curved-line representation and measure a distance along the medical tube between the points, or perform other permitted operations.

At 410, method 400 includes determining whether input for performing a measurement of the medical tube has been received. In various examples, the input may be received from a user of the x-ray imaging system. For example, the user may wish to determine a distance between a first point of the medical tube and a second point of the medical tube (e.g., points 210 and 212 of FIG. 3), and the user may enter a selection of the first point and the second point into a software program for displaying the x-ray image on the display device. In other examples, the input may be computer generated, and the measurement may be automatically calculated.

If at 410 no input is received for taking a measurement, method 400 proceeds to 412. At 412, method 400 includes continuing to display the x-ray image with the representation of the medical tube. Alternatively, if at 410 input is received for taking a measurement (e.g., the first point and the second point), method 400 proceeds to 414.

At 414, method 400 includes calculating a tube length between the first point and the second point along the medical tube (e.g., a length of a portion of the medical tube). In various embodiments, the tube length between the first point and the second point may be determined by first taking the reference points included in the curved-line representation of the medical tube between the first point and the second point. Then, the length of the segments connecting the reference points may be calculated and summed to obtain the total distance between the first point and the second point (e.g., the tube length). In this way, the calculation of the distance may be performed more quickly, accurately, and with less computation than alternative methods that rely on estimating the distance from an arrangement of positive pixels of the binary segmentation mask.

At 416, method 400 includes displaying the measured length of the medical tube, and method 400 ends.

Figure 5:
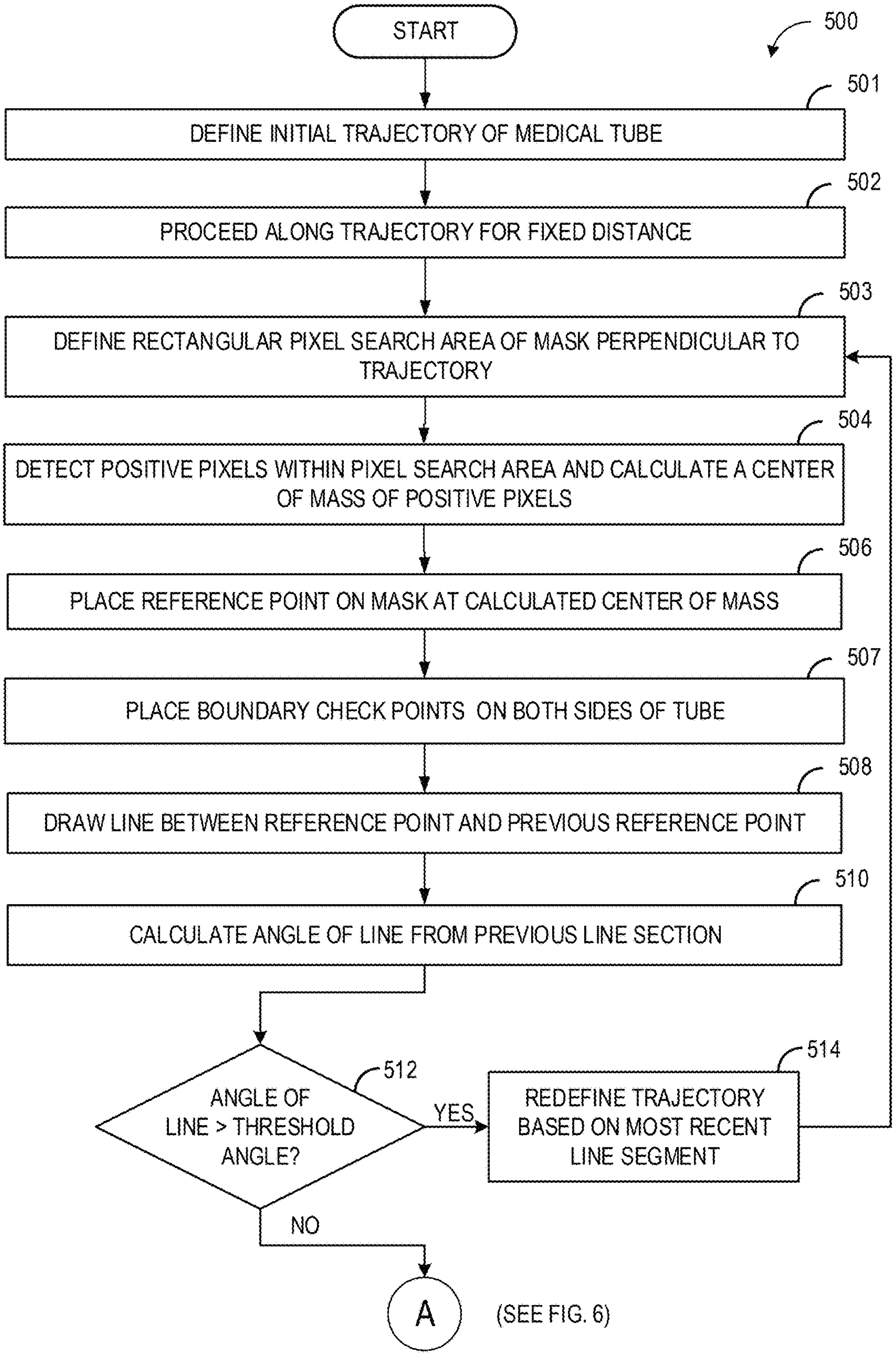
FIG. 5 is a flowchart illustrating a first method for generating a representation of a medical tube from an x-ray image, in accordance with one or more embodiments of the present disclosure.

Referring now to FIG. 5, a method 500 is shown for assigning reference points to positive pixels of a binary segmentation mask representing a medical tube in an x-ray image, to draw a curve through the positive pixels to generate a more precise outline of the medical tube. Method 500 may be performed as part of method 400 described above, by the processor of the imaging system.

Method 500 begins at 501, where method 500 includes defining an initial trajectory of a pixel search procedure defined in steps 502-510. At a beginning or top of the medical tube, meaning, at an end of the medical tube closest to an insertion point of the medical tube into a body of a patient, the medical tube may be assumed to be straight, and the initial trajectory may be aligned with the straight, initial portion of the medical tube at the insertion point.

At 502, method 500 includes iteratively proceeding along the trajectory (e.g., along the medical tube), at fixed, predefined increments of distance or length of the medical tube. In various embodiments, the fixed distance may be a configurable parameter stored in a configuration file of the x-ray imaging system, which may be adjusted by the user. For example, in one embodiment, the fixed increments of distance may be half of a thickness of the medical tube. Thus, steps 502-510 may be performed repeatedly and iteratively at a plurality of points along the trajectory, each point at the fixed increment of distance from a preceding point.

At 503, method 500 includes (at each fixed distance from a preceding reference point) defining a two-dimensional (2-D) pixel search area of the mask. The pixel search area may represent a bounding box within which positive pixels of the mask may be detected. In various embodiments, the pixel search area may be a rectangular pixel search area that is perpendicular to the trajectory. While a rectangular pixel search area is described herein, it should be appreciated that in other embodiments, the pixel search area may be a different shape, such as a square, or oval shape, and the pixel search area may be oriented to the trajectory in a way that is not perpendicular. For example, the pixel search area may be oriented to the trajectory in accordance with a predefined search angle. The pixel search area may have a height and width that are centered at a relevant point on the trajectory (e.g., at the fixed increment of distance from a preceding point).

At 504, method 500 includes detecting positive pixels within the rectangular pixel search area, and calculating a center of mass of the detected positive pixels. At 506, method 500 includes placing a reference point on the mask at a location of the calculated center of mass. At 507, method 500 includes placing boundary check points outside and at an edge of a boundary of the positive pixels, which are used to generate boundary check lines to check for loops or anomalies in the medical tube, as described in greater detail below. In various embodiments, the boundary check points may be placed along a midline of the rectangular pixel search area, at a fixed distance outside an edge of the detected positive pixels. At 508, method 500 includes drawing a line between the placed reference point and a previous reference point (or insertion point).

At 510, method 500 includes calculating an angle of the line with respect to a previous line section, where an initial line section between the insertion point and the placed reference point is assumed to be zero degrees. At 512, method 500 includes determining whether the angle is greater than a threshold angle. For example, the threshold angle may be 10 degrees. If the angle is greater than the threshold angle, then method 500 proceeds to 514.

At 514, method 500 includes redefining or adjusting the trajectory based on the most recent line segment, and method 500 proceeds back to 503, to redefine the rectangular pixel search area perpendicular to the adjusted trajectory.

In other words, method 500 iteratively proceeds along a trajectory of the positive pixels, drawing rectangular search areas at fixed distances and along a fixed trajectory, placing reference points at the centers of each rectangular search area, and connecting the reference points to create a line with a plurality of segments. When an angle between a most recent line segment of a current iteration and a second line segment of an immediately preceding iteration exceeds the threshold, there may be a curve the medical tube. In such situations, the fixed trajectory is adjusted such that the rectangular pixel search area is generated perpendicular to the most recent line segment, which becomes the new fixed trajectory. In this way, the rectangular search areas are maintained perpendicular to a path of the medical tube, and the method is able to accommodate curves in the medical tube.

Figure 9:
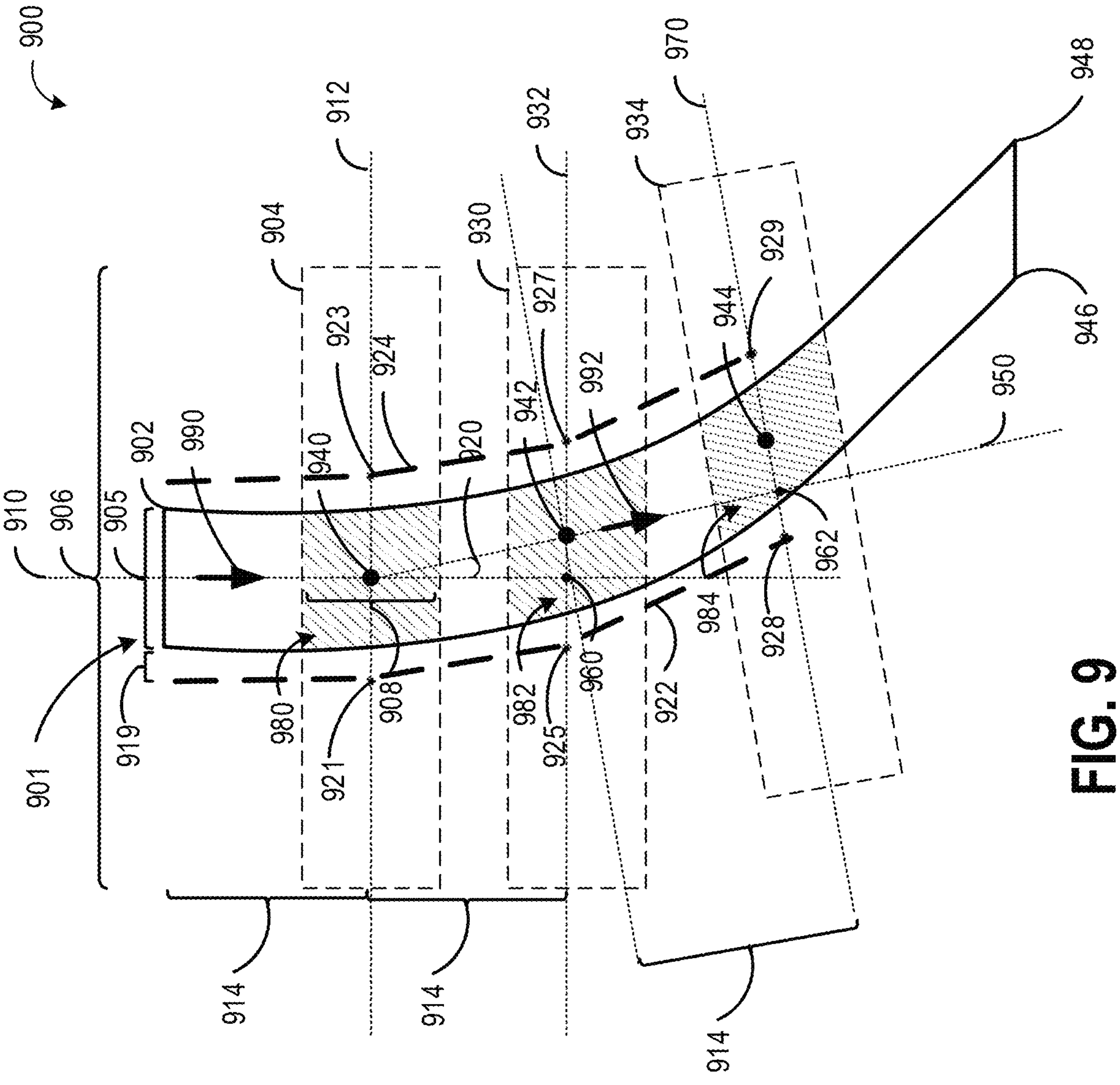
FIG. 9 is a diagram showing how center points of pixels representing a medical tube in an x-ray image may be determined, in accordance with one or more embodiments of the present disclosure.

As an example, FIG. 9 shows a binary segmentation mask 900 including exemplary rectangular pixel search areas that are generated as described in method 500. Binary segmentation mask 900 includes a positive pixel area 902 corresponding to a portion of a medical tube, where positive pixel area 902 is surrounded by negative pixels. Positive pixel area 902 starts at a first end 901, which may correspond to a top of the medical tube at an insertion point into a patient's body. For example, the tube may be a nasogastric tube, and the insertion point may be a nose of the patient.

When method 500 starts at 502, a first rectangular search area 904 may be created. First rectangular search area 904 may have a width 906 and a height 908. First rectangular search area 904 may be positioned with a center point 940 at a distance 914 from first end 901 along an initial trajectory 990, which is aligned with a central axis 910 of the medical tube at the insertion point. Distance 914 may be a predefined distance that may be configured by an operator of the imaging system, for example. In some examples, distance 914 may be based on a width 905 of the positive pixel area 902. First rectangular search area 904 may be positioned such that a central axis 912 along the width of first rectangular search area 904 is perpendicular to the initial trajectory 990 (e.g., and central axis 910). In accordance with method 500, positive pixels within first rectangular search area 904 are detected (e.g., corresponding to a location of the medical tube), shown in a shaded area 980. A reference point 940 is then placed at a center of mass of the positive pixels detected, and boundary check points 921 and 923 are placed at a fixed distance from reference point 940 on both sides of the positive pixels (e.g., such that boundary check lines through boundary check points 921 and 923 are a fixed distance from line segments drawn through the reference points. For example, the fixed distance 919 may be two times the tube thickness.

The algorithm of method 500 then proceeds the fixed distance 914 along the initial trajectory 990, to a point 960. A second rectangular search area 930 is then generated that is centered on point 960, with width 906 and height 908, such that a central axis 932 along the width of second rectangular search area 930 is perpendicular to the initial trajectory 990. Positive pixels within second rectangular search area 930 are detected, shown in a shaded area 982. A reference point 942 is then placed at a center of mass of the positive pixels detected, and boundary check points 925 and 927 are placed at a fixed distance from reference point 942 on both sides of the positive pixels.

Reference point 942 is offset from the location of point 960, indicating that the medical tube curves away from initial trajectory 990. A line 950 connecting reference point 940 of first rectangular search area 904 with reference point 942 of second rectangular search area 930 intersects initial trajectory 990 at an angle 920. If angle 920 is less than a threshold angle, a new trajectory 992 may be used for placement of a next rectangular search area. The algorithm of method 500 proceeds to a new reference point 962 and generates a third rectangular search area 934 centered at the point 962. Third rectangular search area 934 is oriented such that a central axis 970 along the width of third rectangular search area 934 is perpendicular to the new trajectory 992, with the width 906 and the height 908. Positive pixels within third rectangular search area 934 are detected, shown in a shaded area 984. A reference point 944 is then placed at a center of mass of the positive pixels detected, and boundary check points 928 and 929 are placed at the fixed distance from reference point 944 on both sides of the positive pixels.

Alternatively, if angle 920 is greater than the threshold angle, the algorithm of method 500 generates the third rectangular search area 934 centered at the point 942 and perpendicular to the line segment between reference point 940 and reference point 942, and performs a new search. In other words, the new search is performed around the previously established reference point, but with a new orientation based on angle 920.

The algorithm continues in this manner, placing reference points at fixed distances (also referred to herein as steps, each step having a step size) along a trajectory, and adjusting the trajectory as the medical tube curves. When an end of the positive pixels (e.g., an end of the medical tube) is reached, or an end of a section of the medical tube, the reference points 940, 942, 944, and so on may be connected by a line, which may define a path of the medical tube. This line may be used to generate a representation of the medical tube to be superimposed on an x-ray image, as described above.

During the addition of reference points, check boundary points 921, 925, and 928 may be connected by a first boundary check line 922 at the fixed distance 919 from a first (left) edge 946 of the positive pixels, and check boundary points 923, 927, and 929 may be connected by a second boundary check line 924 at the fixed distance 919 from a second (right) edge 948 of the positive pixels. The boundary check lines may be used to detect anomalies that may be caused by loops in the medical tube or other issues, as described below in reference to FIG. 6.

Figure 6:
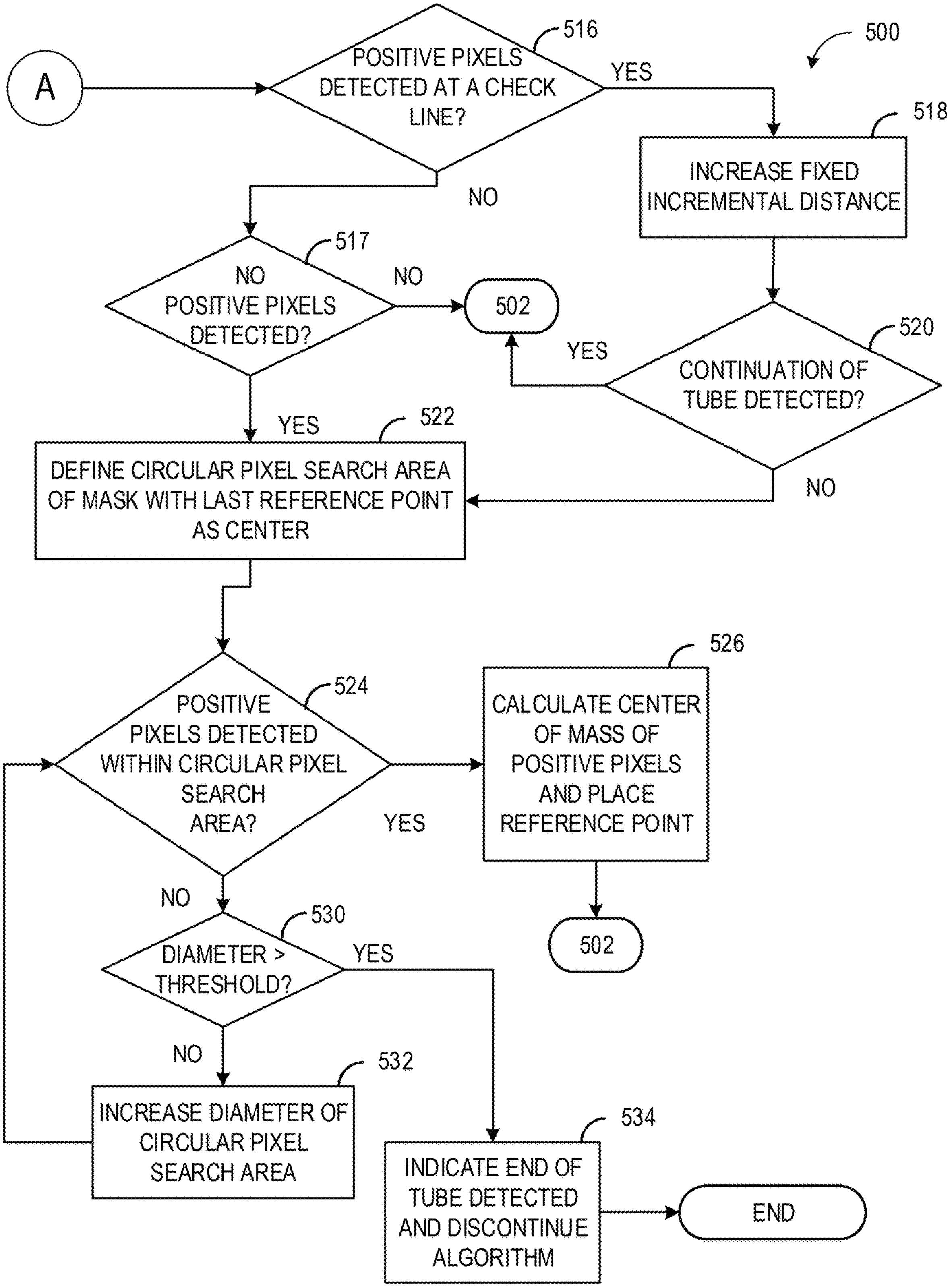
FIG. 6 is a flowchart illustrating a continuation of the method of FIG. 5.

Referring now to FIG. 6, method 500 continues at 516, where method 500 includes determining whether positive pixels (e.g., a threshold number of positive pixels greater than one) are detected at or within the boundary check lines (e.g., boundary check lines 922 and 924), but separate from the positive pixels detected in the rectangular pixel search area. In other words, for the purpose of this section, detecting positive pixels within a boundary check line refers to detecting a separate group of positive pixels that are spaced apart from the positive pixels of the medical tube. If positive pixels are detected within a boundary check line, the algorithm may disambiguate between positive pixels representing the medical tube, and positive pixels representing something other than the medical tube (e.g., something confused with the medical tube by the AI segmentation model that created the binary segmentation mask), or a different portion of the medical tube (in the case of a loop.

Figure 10:
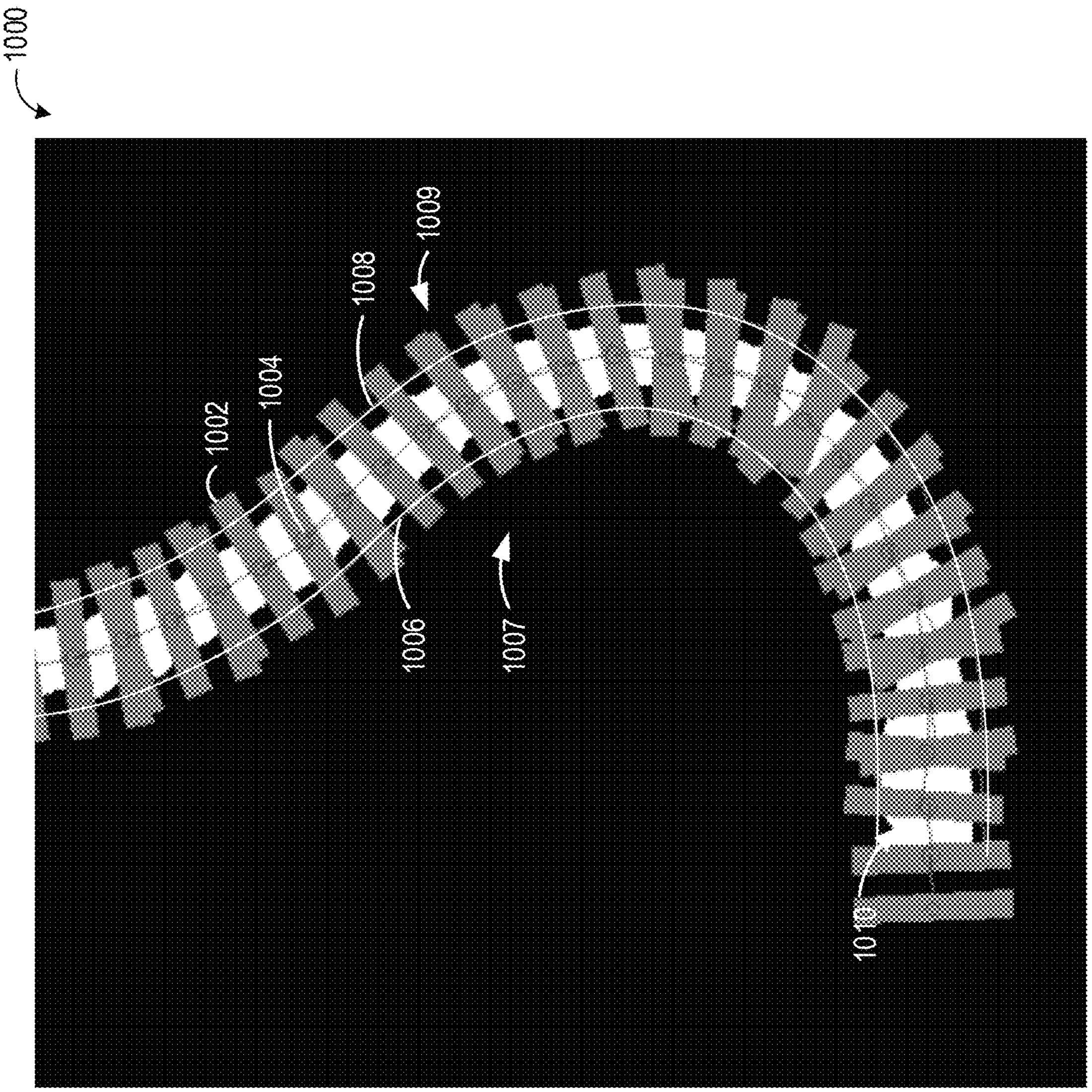
FIG. 10 shows a first example of a medical tube tracing algorithm, in accordance with one or more embodiments of the present disclosure.

For example, referring briefly to FIG. 10, a first binary segmentation mask 1000 is shown, where rectangular pixel search areas 1002 generated as a result of method 500 are shown. Each rectangular pixel search area 1002 has a reference point 1004 at its center, which may be connected to form a curve matching a path of the depicted medical tube. A first boundary check line 1006 is shown at a first side 1007 of the positive pixels, and a second boundary check line 1008 is shown at a second side 1009 of the positive pixels. In FIG. 10, an end 1010 of the medical tube is detected by the algorithm, and no positive pixels are detected within first boundary check line 1006 or within second boundary check line 1008 (e.g., between the boundary check lines).

Figure 11:
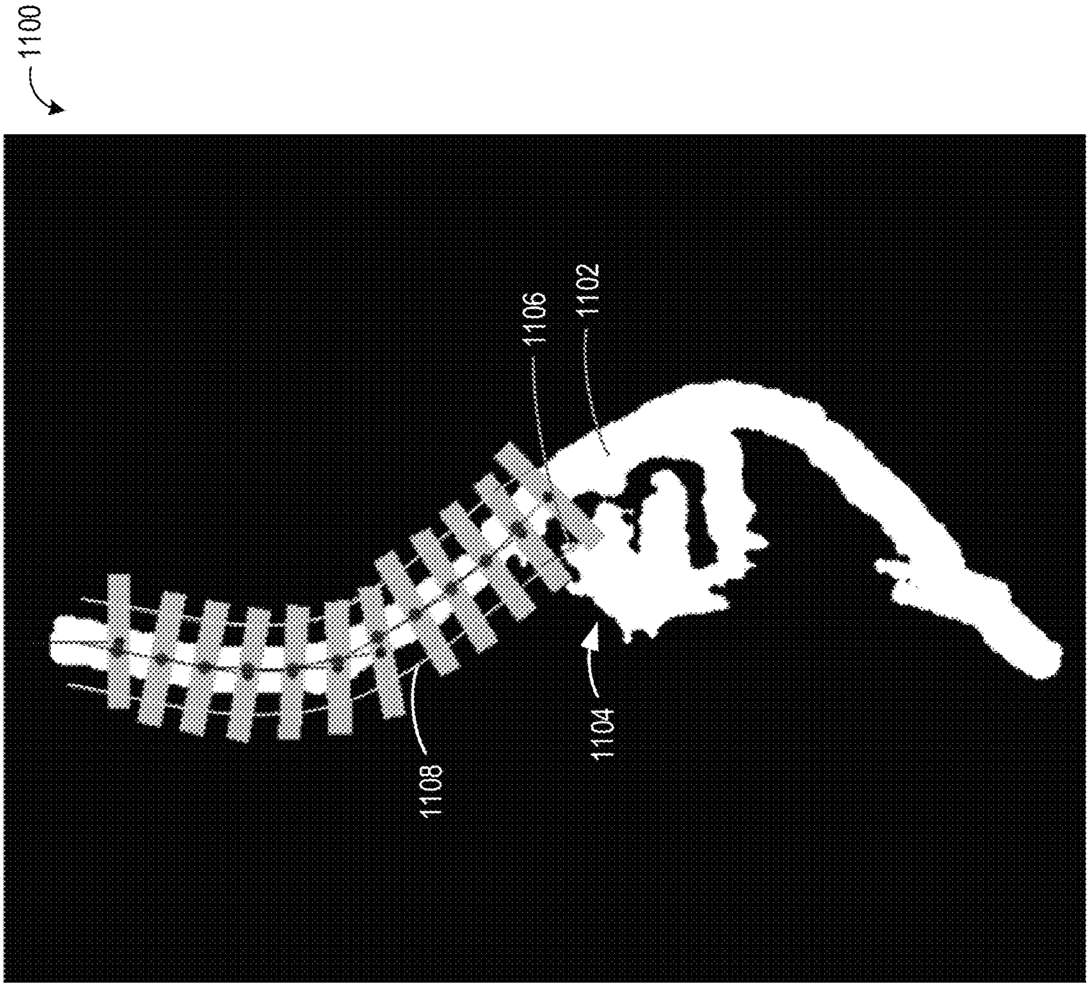
FIG. 11 shows a second example of a medical tube tracing algorithm, in accordance with one or more embodiments of the present disclosure.

In contrast, FIG. 11 shows a second binary segmentation mask 1100, also with rectangular search areas. However, second binary segmentation mask 1100 includes a second anomalous grouping of positive pixels 1104 that do not appear to be correlated with a first grouping of positive pixels 1102 associated with a medical tube. A portion 1106 of the second anomalous grouping of positive pixels 1104 extends within a boundary check line 1108 drawn outside an edge of the first grouping of positive pixels 1102. As result of the portion 1106 of positive pixels extending inside the boundary check line 1108, method 500 may employ a disambiguation strategy to disambiguate the second anomalous grouping of positive pixels 1104 from the first grouping of positive pixels 1102, as described below.

Figure 12:
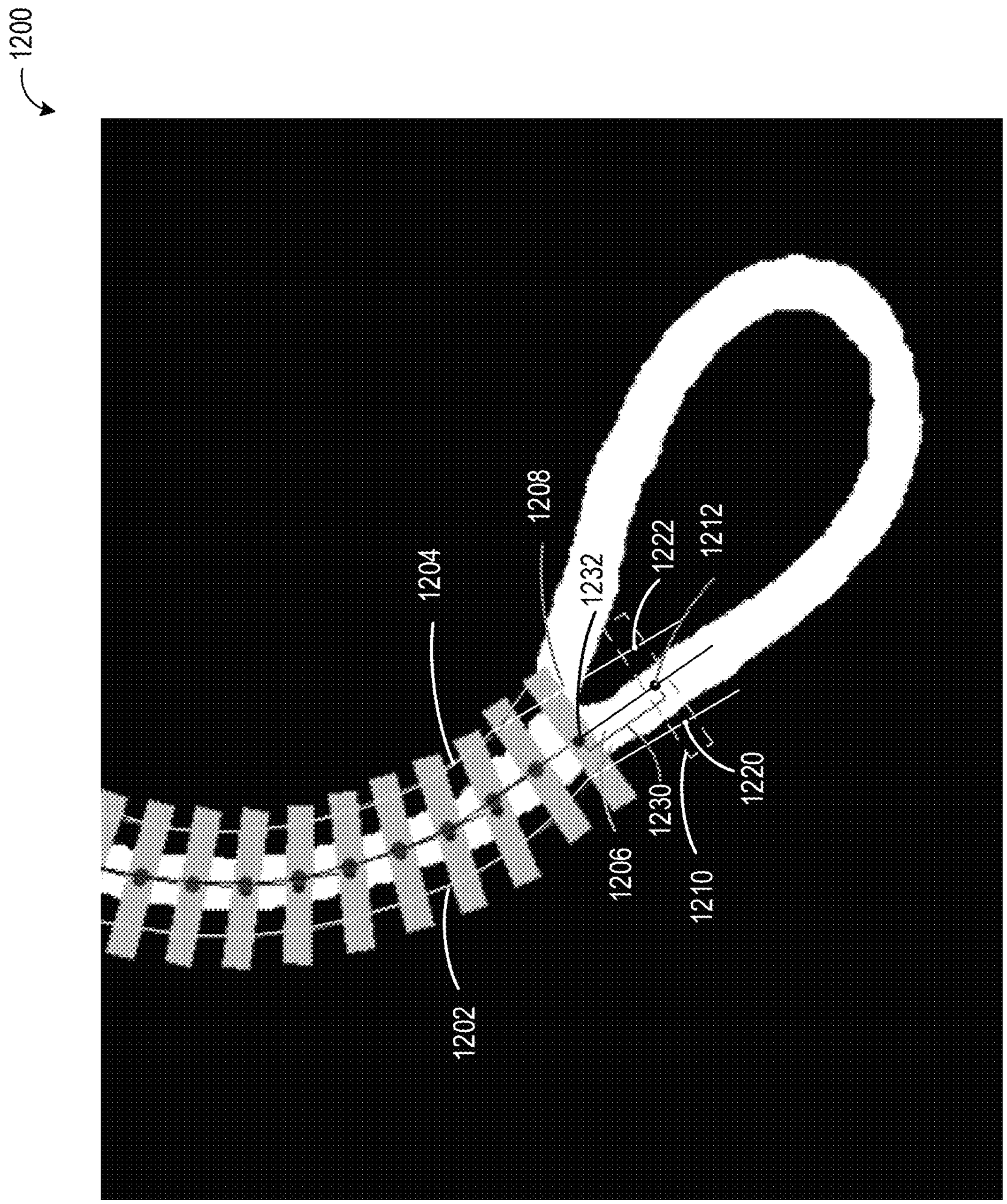
FIG. 12 shows a third example of a medical tube tracing algorithm, in accordance with one or more embodiments of the present disclosure.

FIG. 12 shows a third binary segmentation mask 1200, also with rectangular search areas illustrated. Third binary segmentation mask 1200 shows a loop in positive pixels representing a medical tube, where in the 2D mask, the medical tube appears to intersect with itself. In particular, a first set of positive pixels are detected within a first boundary check line 1202 at a location 1206, and a second set of positive pixels are detected within a second boundary check line 1204 at a location 1208.

Returning to FIG. 6, if at 516 positive pixels are detected within the boundary check lines but spaced apart from the positive pixels corresponding to the medical tube, method 500 proceeds to 518. At 518, method 500 includes increasing the fixed incremental distance at which the rectangular pixel search areas are generated and the reference points placed. In other words, a step size along the positive pixels of the medical tube is increased to determine whether the positive pixels can be "jumped over", where at the increased fixed incremental distance no positive pixels are detected within the boundary check lines.

For example, referring to FIG. 12, a rectangular pixel search area 1210 may be generated at a new fixed distance 1230 from a preceding reference point 1232 along an expected trajectory of the medical tube. For example the new fixed distance 1230 may be twice as long as the fixed distance between the other reference points placed on third binary segmentation mask 1200. A first new check boundary point 1220 may be created at a first side of the positive pixels detected in rectangular pixel search area 1210, and a second new check boundary point 1222 may be created at a second side of the positive pixels detected in rectangular pixel search area 1210. When the check boundary lines 1202 and 1204 are extended to continue along the trajectory at the new fixed distance 1230 to intersect with first new check boundary point 1220 and second new check boundary point 1222, respectively, no positive pixels are detected within check boundary lines 1202 and 1204. As a result, a new reference point 1212 may be placed at the center of mass of positive pixels detected in rectangular pixel search area 1210, and method 500 may continue. In this way, the loop in the medical tube may be successfully handled by method 500.

Returning to FIG. 6 and method 500, at 520, method 500 includes determining whether a continuation of the medical tube (e.g., the positive pixels representing the medical tube) is detected, as described above. If at 520 some positive pixels are detected within the rectangular pixel search area and no positive pixels are detected within the boundary check lines after the increase in the fixed incremental distance, it may be inferred that a continuation of the medical tube has been detected, whereby a new point is added to the detected trajectory, and method 500 proceeds to 502 to perform a subsequent search. Alternatively, if at 520 the continuation of the medical tube is not detected, method 500 proceeds to 522.

Returning to 516, if at 516 no positive pixels are detected within the boundary check lines, method 500 proceeds to 517. At 517, method 500 includes determining whether any positive pixels are detected within the rectangular pixel search area. For example, when the end of the medical tube is reached, no positive pixels may be detected within the rectangular pixel search area. If positive pixels are detected in the rectangular pixel search area, then the answer is NO, and method 500 proceeds back to 502 to continue with the algorithm. If no positive pixels are detected in the rectangular pixel search area, then the answer is YES, and method 500 proceeds to 522.

At 522, method 500 includes defining a circular pixel search area of the mask (rather than the rectangular pixel search area) using the last reference point placed as a center point of the circular pixel search area. At 524, method 500 includes determining whether any positive pixels are detected within the circular pixel search area. If positive pixels are detected within the circular pixel search area, method 500 proceeds to 526, where method 500 includes calculating a center of mass of the positive pixels detected within the circular pixel search area, and placing a reference point at the center of mass. Method 500 then proceeds back to 502, where the algorithm is continued.

If no positive pixels are detected within the circular pixel search area, method 500 proceeds to 530, where method 500 includes determining whether the diameter of the circular pixel search area is greater than a threshold diameter. If the diameter of the circular pixel search area is not greater than the threshold diameter, method 500 proceeds to 532, where the diameter of the circular pixel search area is incrementally increased, and then back to 524. That is, successively larger diameter circular pixel search areas may be used to widen a search for positive pixels, to determine whether the end of the medical tube has been detected. For example, an initial diameter of the circular pixel search area may be equal to the regular step size, or half of the tube thickness, and the initial diameter may be incrementally increased by the same step size until achieving a threshold diameter of five times the step size. If the threshold diameter is achieved at 530, then method 500 proceeds to 534. At 534, an end of the medical tube is indicated, and the algorithm is discontinued. Method 500 ends.

Thus, method 500 illustrates a first procedure for fitting a curve to positive pixels of the binary segmentation mask to generate an outline of the medical tube, which may work well for certain configurations of the medical tube. However, for other configurations, method 500 may not result in a curve that closely aligns with the positive pixels, such as when loops are present in the medical tube.

Figure 7:
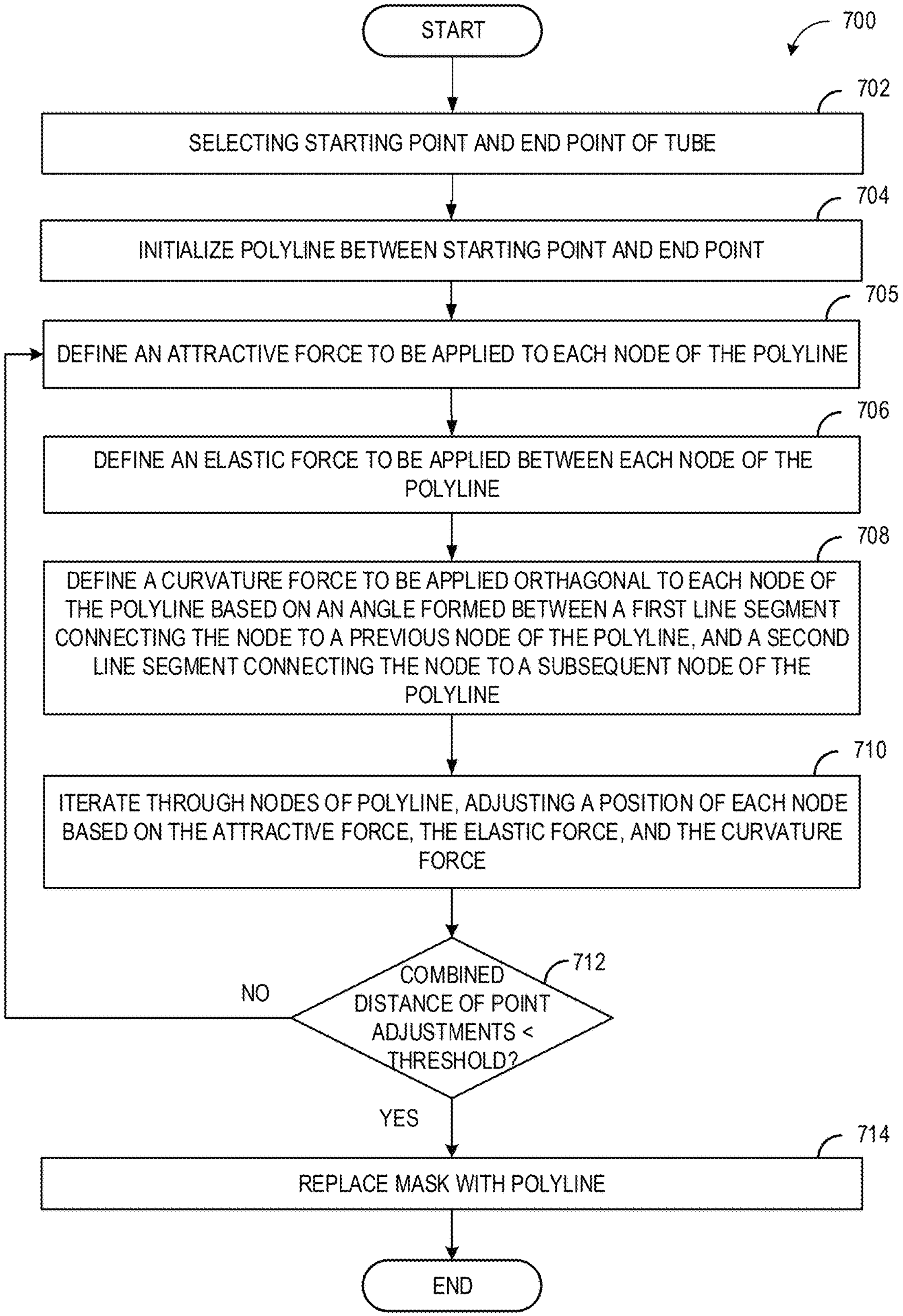
FIG. 7 is a flowchart illustrating a second method for generating a representation of a medical tube from an x-ray image, in accordance with one or more embodiments of the present disclosure.

FIG. 7 shows an alternative method 700 for fitting a curve to the positive pixels of the binary segmentation mask to generate a precise outline of the medical tube, where method 700 may be used instead of method 500 of FIGS. 5 and 6. Method 700 may be performed as part of method 400 described above, by the processor of the imaging system.

Method 700 starts at 702, where method 700 includes selecting a starting point and an endpoint of the tube in the positive pixels of the mask. In one embodiment, selecting the starting point may include determining an initial trajectory of the tube, as described above in reference to method 500. A first set of the positive pixels may then be selected that are aligned along a line perpendicular to the initial trajectory at an initial portion of the initial trajectory. A center pixel of the first set of the positive pixels may be selected as the starting point of the tube. A similar procedure may be used to determine the endpoint of the tube, where a second set of the positive pixels may be selected that are aligned along a line perpendicular to a final trajectory of the tube at an end of the final trajectory, and a center pixel of the second set of the positive pixels may be selected as the endpoint of the tube.

At 704, method 700 includes initializing a polyline between the starting point and the endpoint. The polyline may include a connected sequence of line segments of a predefined length starting at the starting point and ending at the endpoint, where the polyline further includes a set of nodes defining starting and ending points of each line segment of the sequence of line segments (at the predefined distances). The polyline may be initialized as a straight line.

After initialization, the polyline may be iteratively fine-tuned to ensure that the polyline covers the detected positive pixels. This may be ensured by defining forces that attract the polyline points towards the positive pixels, and then iteratively moving the points according to these forces, as described below. At each step, various forces on a polyline node may be summed to generate a net force, with a direction and a magnitude. During each iterative adjustment of points, the points may be moved proportionally to the forces acting on them. Using a physics analogy, this corresponds to objects moving in a thick liquid, where a velocity of the node as it moves is proportional to the force. The method uses an arbitrary unit for the forces that corresponds to the amount of movement generated in a single step. That is, if a net force acting on a polyline node is three, then in one iteration, the point is moved by three pixels in the direction of the force. Specifically, each node may be adjusted based on the following forces:

1. Curve fitting with attractive forces. A first set of attractive forces may move each node to a closest positive pixel in the binary segmentation mask to the node. A second set of attractive forces are defined for each positive pixel in the binary segmentation mask, which pull a closest polyline node to the positive pixel. The first set of attractive forces and the second set of attractive forces are combined to determine a net attractive force.
2. Length regularization via an elastic force: if a polyline segment is longer or shorter than the predefined inter-node distance (e.g., the distance between each node), then the elastic force acts to maintain the predefined distance.
3. Curve regularization: if the polyline is not straight at a given node, then one or more curvature forces may be applied to neighboring nodes of the given node that act to straighten the polyline, to ensure that the fitted polyline remains more or less smooth.
4. Tip regularization: An additional force may act to pull the end of the polyline to a positive pixel representing the endpoint of the tube, detected as described above, as a fine-tuning for the fit curve. The endpoint of the tube may be detected by a separate model, in some embodiments.

Thus, in addition to attractive forces, the method also includes regularization forces, which may keep the polyline close to an optimal length, and mitigate sharp turns. The forces are described in greater detail below.

At 705, method 700 includes defining the first and second sets of attractive forces to be applied, that pull each node of the polyline to the positive pixels. The first set of attractive forces may be applied to the nodes of the polyline, where an attractive force is applied to each node in a direction of a closest point of the positive pixels of the binary segmentation mask to the node. The first set of attractive forces pull each node in the direction of a respective closest positive pixel, where a magnitude of the attractive force at the node is a function of a distance between the node and the respective positive point or pixel. If the distance between the node and the respective positive point is zero, then the respective attractive force should be zero, and the force should increase as the distance increases. Optionally, a distance threshold may be applied, above which the force does not increase any more, or even becomes zero.

Figure 15:
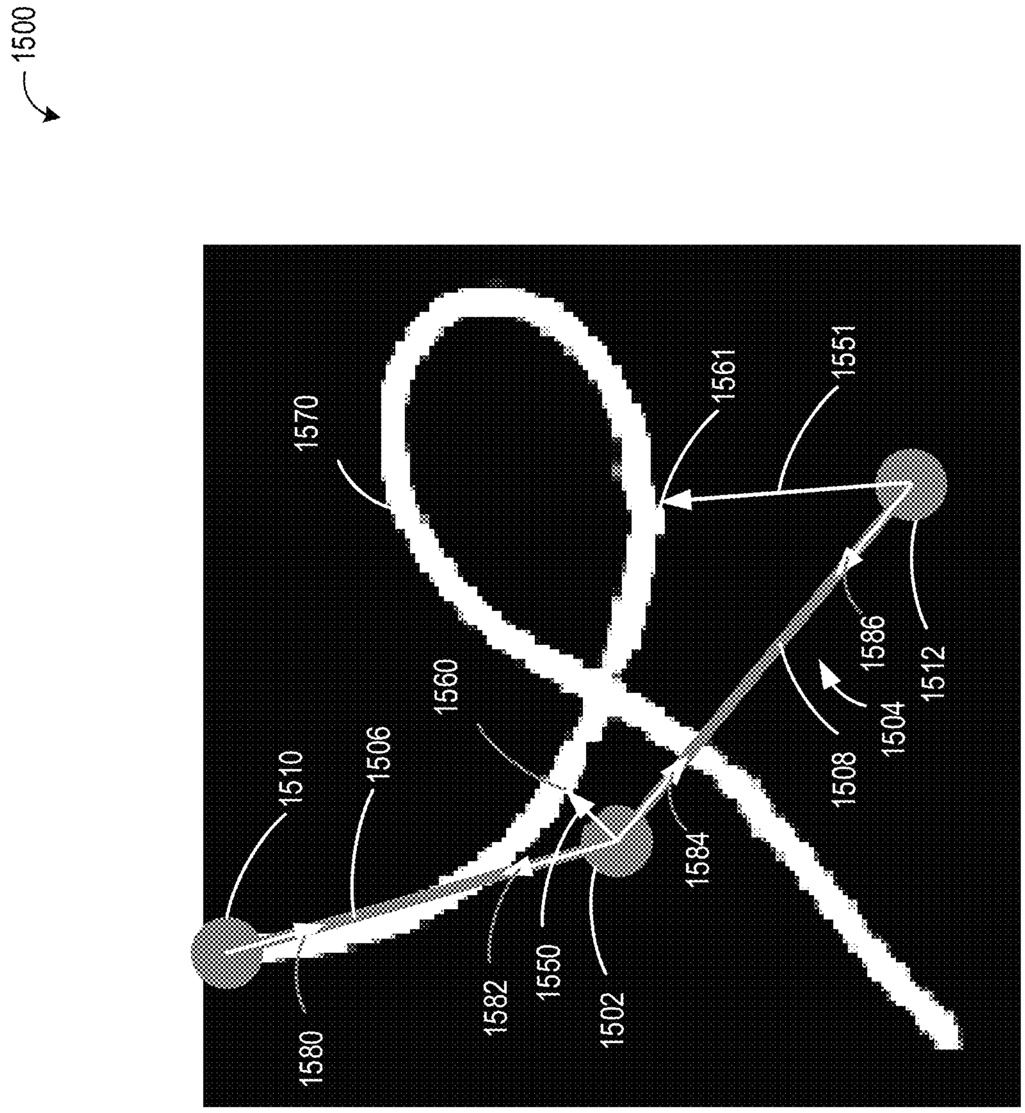
FIG. 15 is a first diagram showing how forces may be applied to points of a polyline to approximate a pixel representation of a medical tube, in accordance with one or more embodiments of the present disclosure.

FIG. 15 shows a first force diagram 1500 illustrating an attractive force 1550 applied to a node 1502 of a polyline 1504, where attractive force 1550 is one of the first set of attractive forces. By applying the first set of attractive forces including attractive force 1550 to nodes of polyline 1504, polyline 1504 may be adjusted to approximate a shape of the positive pixels of a binary segmentation mask 1570. Polyline 1504 includes a first line segment 1506 and a second line segment 1508, which connect node 1502 with a previous node 1510 and a subsequent node 1512, respectively. Similarly, a second attractive force 1551 may be applied to node 1512, in a direction of a closest pixel 1561 of the binary segmentation mask 1570 to node 1512. In other words, a direction of attractive force 1550 may be calculated based on a closest positive pixel 1560 of the binary segmentation mask 1570 to node 1510. The closest pixel to a given node may be determined by calculating a distance of the node to all positive pixels, and determining a minimum of these distances to obtain the closest pixel/point. The magnitude of the attractive force is calculated as a function of the distance between the node and the closest pixel, where the magnitude is greater as the distance increases and lesser as the distance decreases, creating an asymptotic effect as the node is moved towards the closest pixel in accordance with the attractive force 1550.

The first set of attractive forces defined above pull each polyline node to the closest positive mask pixel. However, the first set of attractive forces only take into account the positive mask pixels that are the closest pixel for at least one of the polyline nodes. For example, if there are 50 polyline nodes and 1000 positive mask pixels, then only the 50 closest pixels are used in the calculation of the first set of attractive forces. In order to increase an efficiency of the method, all the positive mask pixels are taken into account by defining the second set of attractive forces. For each positive pixel of the mask, the second set of attractive forces pull a closest polyline node towards the given pixel. This ensures that each node is pulled by a plurality of pixels for which that node is the closest node.

Figure 16:
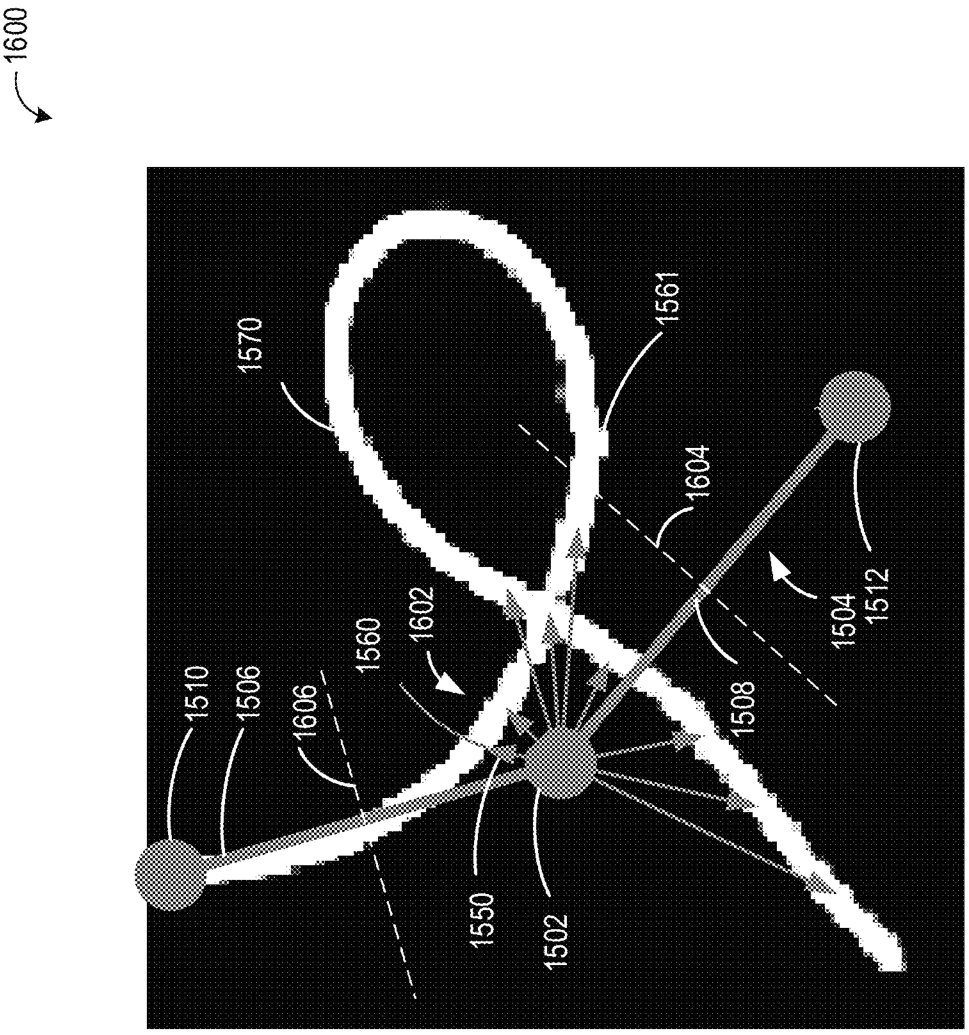
FIG. 16 is a second diagram showing how forces may be applied to points of a polyline to approximate a pixel representation of a medical tube, in accordance with one or more embodiments of the present disclosure.

FIG. 16 shows a second force diagram 1600 that depicts the second set of attractive forces applied to polyline 1504 of FIG. 15. The second set of attractive forces are shown as grey arrows 1602. For each positive pixel of the mask, a distance may be determined between the respective positive pixel and each node of the polyline. A minimum distance may then be selected to determine a closest node to the respective positive pixel, and a second attractive force is applied to the closest node in the direction of the respective positive pixel, with a magnitude a function of the distance. Incorporating the second set of attractive forces ensures that all the mask pixels are taken into account.

For example, a first dashed line 1604 indicates a halfway point between node 1502 and node 1512, and a second dashed line 1606 indicates a halfway point between node 1502 and node 1510. Dashed lines 1604 and 1606 represent boundaries for determining a closest polyline node to each positive pixel of the mask, in accordance with the procedure described above. That is, node 1502 is the closest node to positive pixels of the mask located between dashed lines 1604 and 1606; for positive pixels above dashed line 1606 in FIG. 16, node 1510 is the closest node, and for positive pixels below dashed line 1604, node 1512 is the closest node. Thus, gray arrows 1602 represent individual forces of the second set of forces applied to the node in the direction of a plurality of sample positive pixels of the mask located between dashed lines 1604 and 1606. The second set of forces may combined with the first set of forces depicted in FIG. 15 and summed to generate a net force on each node, which is then applied, drawing the node to the polyline.

Such calculations may be performed in a linked manner, where a matrix of distances between each pair of nodes and pixels is calculated. Then, a location of a row minima provides the closest node to each pixel, and a location of column minima provides the closest pixel to each node.

Returning to method 700, at 706, method 700 includes defining the elastic force to be applied between each node of the polyline. The elastic force is a force applied to each node, both in a first direction of a subsequent node of the polyline, and in a second direction of a previous node of the polyline. In other words, the elastic force pulls each node towards immediately adjacent nodes of the connected sequence. The elastic force between two nodes may be applied as a function of a distance between two nodes, where the elastic force increases as a function of the distance. Thus, a first elastic force applied equally to two consecutive nodes that are farther apart may be greater than a second elastic force applied equally to two consecutive nodes that are closer together. In various examples, the clastic force may be a non-linear force.

Elastic forces are depicted in FIG. 15, described above. A first elastic force 1582 is applied to node 1502 in a direction of previous node 1510, with an equal and opposite elastic force 1580 being applied to previous node 1510 in a direction of node 1502; and a second elastic force 1584 is applied to node 1502 in a direction of subsequent node 1512, with an equal and opposite clastic force 1586 being applied to subsequent node 1512 in a direction of node 1502.

Figure 13:
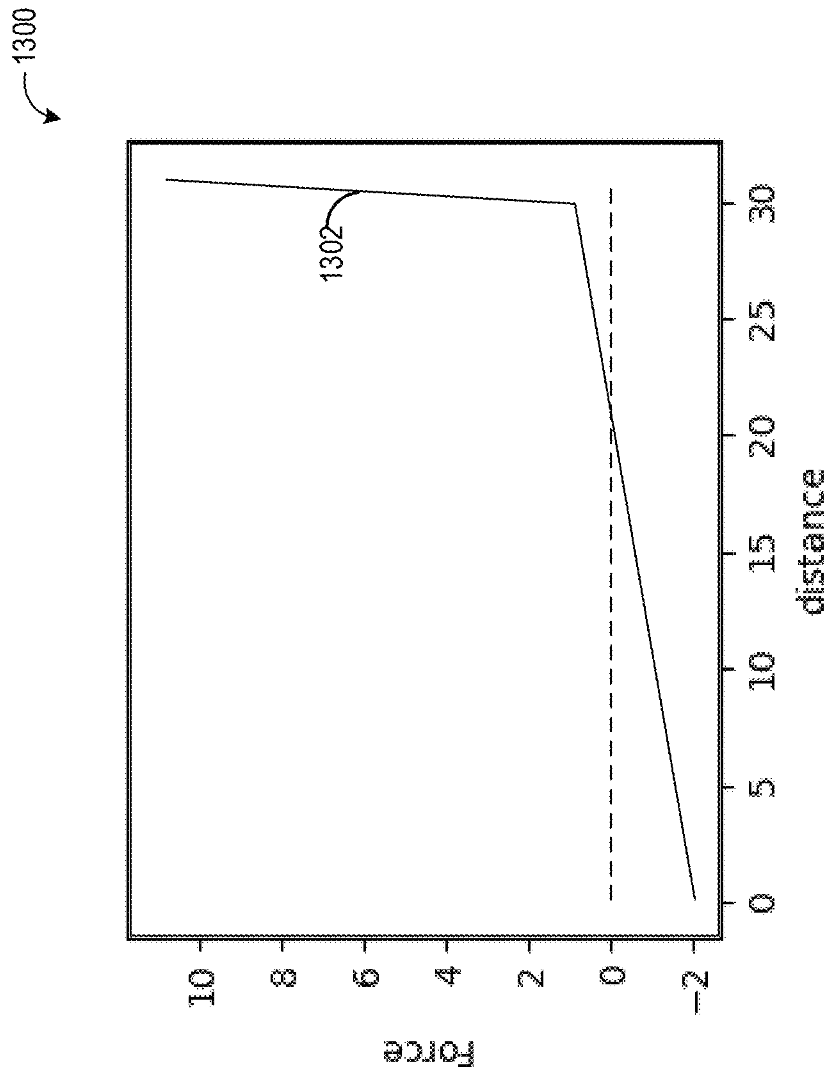
FIG. 13 is a graph plotting a force to be applied to a point of a polyline as a function of a distance of the point to a pixel representation of a medical tube, in accordance with one or more embodiments of the present disclosure.

Referring briefly to FIG. 13, an exemplary graph 1300 depicts an exemplary non-linear function that may define the elastic force applied at a node of the polyline, which may be applied with equal magnitude for two consecutive nodes but in opposing directions. Force is indicated on a vertical axis of graph 1300 in an arbitrary unit, as described above, and distance is indicated on a horizontal axis of graph 1300 in pixels. The non-linear function is indicated by a line 1302. In the depicted example, when a distance between two nodes is less than 20 pixels, the elastic force may be a negative force, meaning that the two nodes may repel each other. The elastic force increases slowly and positively between 20 and 30 pixels, and at 30 pixels, the elastic force increases asymptotically to a maximum force. Thus, in accordance with the depicted non-linear function, the clastic force decreases as two nodes are pulled together by the elastic force until reaching a defined distance between each other (e.g., 20 pixels), after which point the nodes are repelled to maintain the defined distance. The defined distance may be equal to the length of the line segments of the polyline. In this way, the elastic forces between all of the nodes collectively maintain a regularity of the distance between each node.

Returning to method 700, at 708, method 700 includes defining the curvature force to be applied to each node of the polyline, where a magnitude and direction of the curvature force may be based on angle formed between a previous line segment connecting the node to a previous node of the polyline, and a subsequent line segment connecting the node to a subsequent node of the polyline (e.g., a first line segment ending at the node, and a second line segment beginning with the node). That is, for each node of the polyline, the angle is first calculated, and the curvature force is then calculated as a function of the angle.

Figure 19:
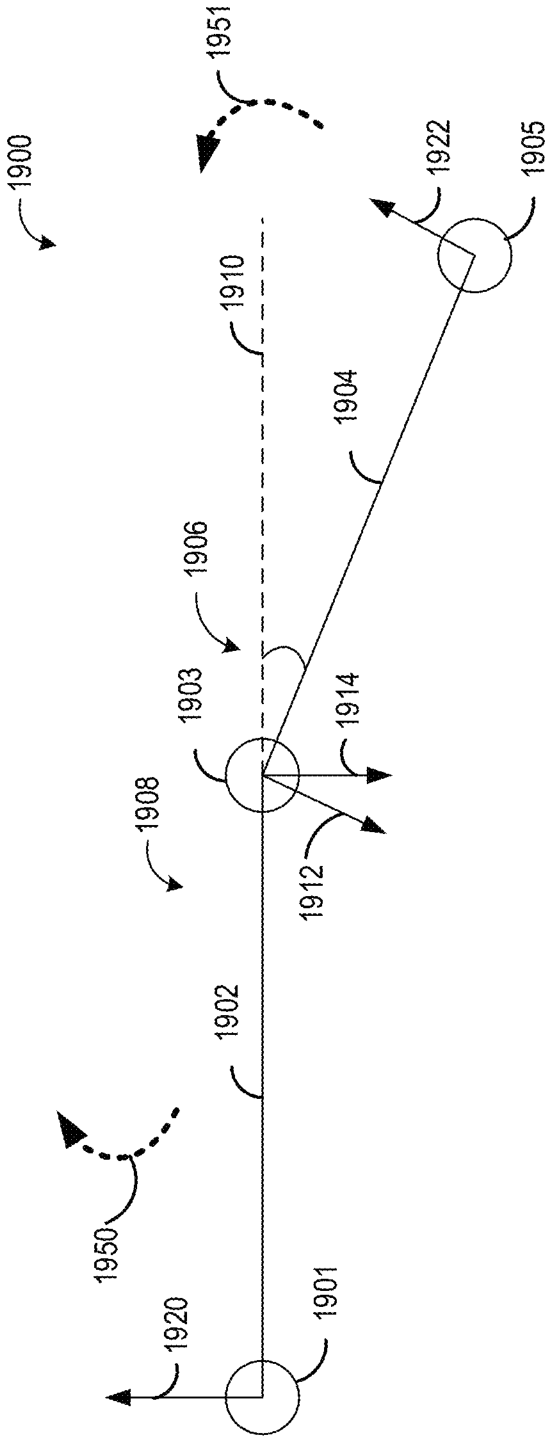
FIG. 19 is a force diagram indicating forces applied to nodes of a polyline, in accordance with one or more embodiments of the present disclosure.

FIG. 19 shows an exemplary force diagram 1900 indicating an application of the curvature force. Force diagram 1900 includes a polyline 1908 comprising a first node 1901, a second node 1903, and a third node 1905. A first segment 1902 connects first node 1901 with second node 1903, and a second segment 1904 connects second node 1903 with third node 1905. Second segment 1904 is offset from a trajectory 1910 of first segment 1902 by an angle 1906. As a result of second segment 1904 being offset by angle 1906, a curvature force 1916 is generated as a function of angle 1906. A first pair of forces 1920 and 1914 are applied orthogonally to nodes 1901 and 1903, respectively, that rotate first segment 1902 in a counterclockwise direction indicated by an arrow 1951. A second pair of forces 1912 and 1922 are applied orthogonally to nodes 1903 and 1905, respectively, that rotate second segment 1904 in a counterclockwise direction indicated by an arrow 1951. The net effect of applying the first pair of forces 1920 and 1914 and the second pair of forces 1912 and 1922 may be to straighten polyline 1908. Straightening polyline 1908 via the curvature force may ensure that curves in polyline 1908 after applying the curvature force are based on curves of the positive pixels of the binary segmentation mask, and not an artifact of method 700.

Figure 14:
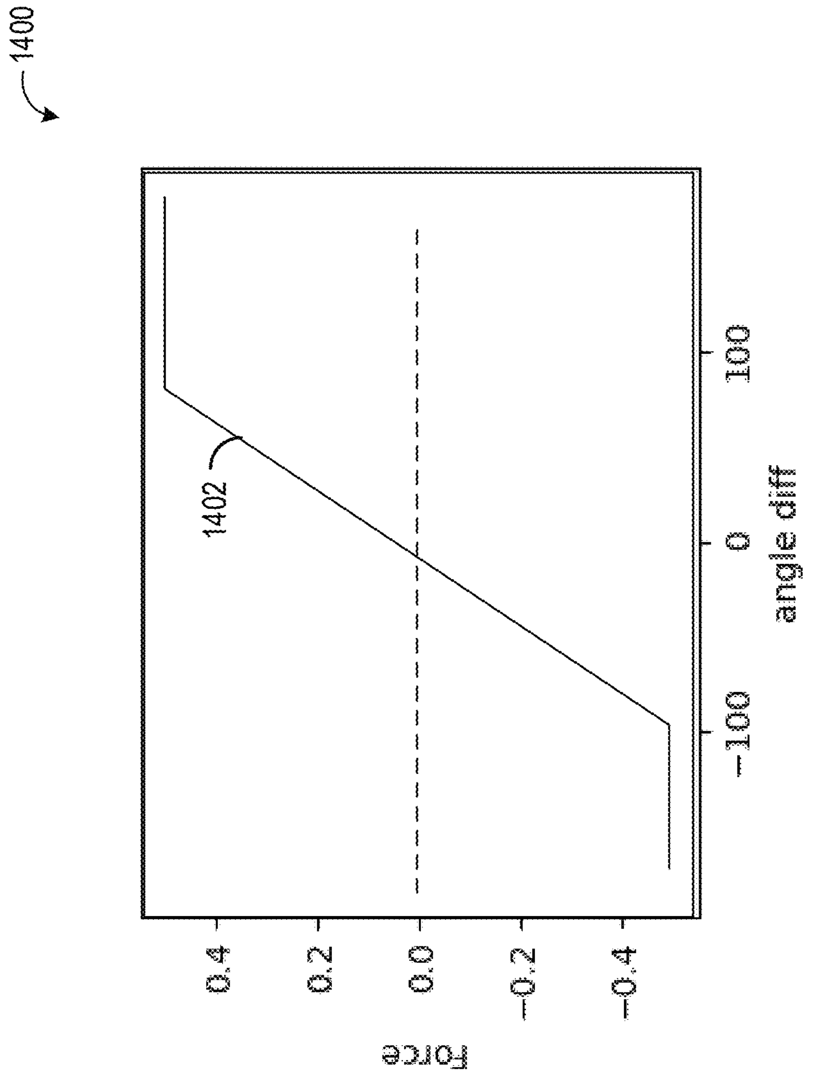
FIG. 14 is a graph plotting a force to be applied to a point of a polyline as a function of a difference in an angle between a first segment of the polyline and a second segment of the polyline, in accordance with one or more embodiments of the present disclosure.

In various examples, the curvature force may be a non-linear force. Referring briefly to FIG. 14, an exemplary graph 1400 depicts an exemplary non-linear function that may define the curvature force applied at a node of the polyline. Force is indicated on a vertical axis of graph 1400 in arbitrary units as described above, and an angle difference between a previous line segment and the subsequent line segment of the node is indicated on a horizontal axis of graph 1400 in degrees.

The non-linear function is indicated by a line 1402, which represents a sigmoid function. When the angle difference between the previous line segment and the subsequent line segment is less than −100, the curvature force may be a constant negative force. When the angle difference between the previous line segment and the subsequent line segment is between −100 and 0, the curvature force may be a negative force that decreases as a function of angle difference. When the angle difference between the previous line segment and the subsequent line segment is between 0 and 100, the curvature force may be a positive force that increases as a function of angle difference. When the angle difference between the previous line segment and the subsequent line segment is greater than 100, the curvature force may be a constant positive force.

Returning to method 700, at 710, method 700 includes iterating through the nodes of the polyline and applying the forces calculated at 705, 706, and 708 at each node, to fit the polyline to the binary segmentation mask. At each iteration, the position of each node may be adjusted in accordance with the attractive force, and the adjustment may be refined by the elastic force and the curvature force. At each iteration, the forces are calculated and positions of the polyline nodes are adjusted in accordance with the forces. At each step of the iteration the sum of these forces on each polyline node are calculated, and each node is incrementally adjusted by a small amount that is proportional to the net force acting on the node. As a result, with each iteration, the polyline approximates the shape of the tube (e.g., the shape of the positive pixels) more closely, until the polyline has been fitted to the curve of the positive pixels.

At 712, method 700 includes determining whether a combined (e.g., a summed) distance of all the adjustments made to the nodes is less than a threshold value. If at 712 it is determined that the combined distance of the point adjustments is not less than the threshold, it may be inferred that the polyline is not aligned with the positive pixels, whereby method 700 proceeds back to 705, and method 700 includes continuing to calculate the forces to be applied to each node and iterate through the nodes of the polyline, further adjusting the nodes. Alternatively, if at 712 it is determined that the combined distance of the node adjustments is less than the threshold value, it may be inferred that the polyline has been fitted to the positive pixels of the binary segmentation mask, and method 700 proceeds to 714. At 714, method 700 includes replacing the mask with the polyline, and method 700 ends.

As with method 500, method 700 may be used to fit a curve to positive pixels of the binary segmentation mask for various configurations of the medical tube, but may not result in curve that closely fits the positive pixels for some configurations of the medical tube, such as loops. Specifically, method 500 is constrained by the fact that the method may be derailed by imperfections of the detected mask, as the algorithm of method 500 relies on local information at each step of the method. Further, once placed, points are frozen and the placements may not be further improved (e.g., to more tightly fit the positive pixels). On the other hand, method 700 is constrained by the fact that the method is strongly dependent on initialization and sensitive to initial conditions, where some initial configurations of the polyline may result in poorer results than other configurations. Additionally, method 700 has a tendency to get trapped in local minima. However, as described below in reference to FIG. 8, elements of method 500 and elements of method 700 may be combined to generate a procedure for achieving a curve that is fitted more precisely to the positive pixels than may be achieved by either of methods 500 and 700 alone. In particular, elements of method 500 may be used to initialize a polyline, and the global optimization of method 700 may be incorporated to regularly fine-tune the position of earlier placed points.

Figure 8:
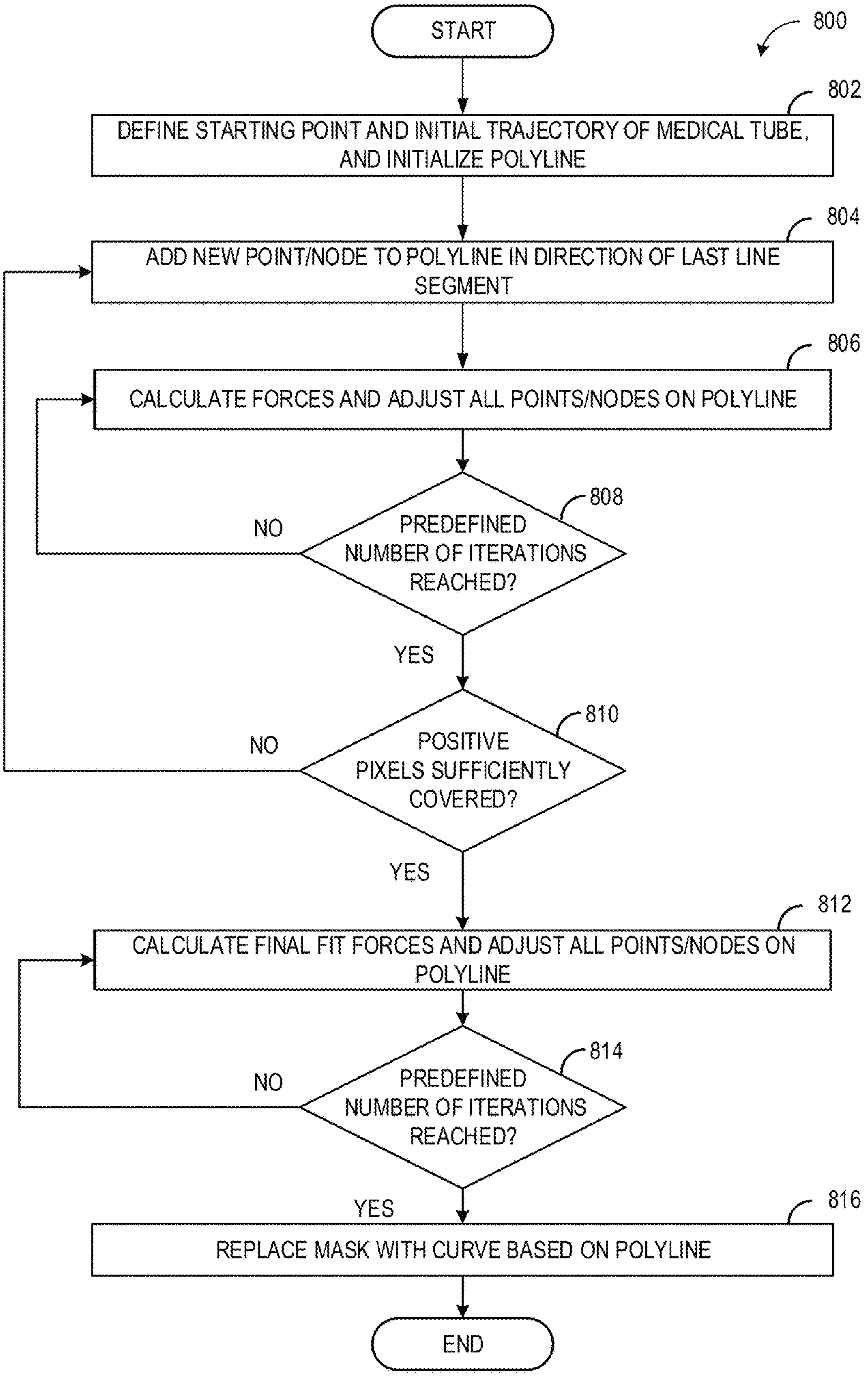
FIG. 8 is a flowchart illustrating a third method for generating a representation of a medical tube from an x-ray image, in accordance with one or more embodiments of the present disclosure.

Referring now to FIG. 8, an exemplary method 800 is shown for fitting a curve to the positive pixels of the binary segmentation mask of method 400 to generate a precise outline of the medical tube, where method 800 relies on parts of both methods 500 of FIGS. 5 and 6, and 700 of FIG. 7. Method 800 may thus be performed as part of method 400 described above, by the processor of the imaging system, where method 800 is used instead of method 500 or 700.

Method 800 begins at 802, where method 800 includes defining a starting point and initial trajectory of the medical tube. Defining the starting point and determining the initial trajectory of the tube may be performed as described above in reference to method 500. The initial trajectory may be defined by two points: the starting point, and a second point, which may be placed at the predefined distance of method 700. A polyline may then be initialized, where the starting point is a first node of the polyline and the second point is a second node of the polyline. A first line segment may be defined between the first node and the second node.

At 804, method 800 includes adding a new point/node to the polyline in a direction indicated by the initial trajectory, as described in reference to method 500. That is, a rectangular search area may be defined within which to search for positive pixels, the positive pixels may be detected within the rectangular search area, and a calculation of a center of mass of the detected positive pixels may be used to determine where to place the new point. A subsequent line segment may be defined from the second node to the new node.

At 806, forces acting on each node of the polyline may be defined and/or calculated, as described above in reference to method 700. The forces may then be used to iteratively adjust each node of the polyline, as in method 700. A first predefined number of iterations may be performed, where during each iteration, the polyline more closely approximates a shape of the positive pixels of the mask.

At 808, method 800 includes determining whether the first predefined number of iterations has been reached. If at 808 it is determined that the first predefined number of iterations has not been reached, method 800 proceeds back to 806, where the forces are recalculated and the nodes of the polyline are adjusted in a next iteration. Alternatively, if at 808 it is determined that the first predefined number of iterations has been reached, method 800 proceeds to 810.

At 810, method 800 includes determining whether the positive pixels of the binary segmentation mask are sufficiently covered by the polyline, meaning, whether the polyline approximates and is aligned to the shape of the positive pixels such that the positive pixels would be obscured by increasing a width of the polyline. If at 808 it is determined that the positive pixels of the binary segmentation mask are not sufficiently covered, it may be inferred that the polyline may be further extended, whereby method 800 proceeds back to 804, and a new point/node is added in a direction of an immediately preceding line segment, in accordance with method 500. Alternatively, if at 808 it is determined that the positive pixels of the binary segmentation mask are sufficiently covered, method 800 proceeds to 812.

At 812, method 800 includes calculating a set of final fit forces. The final fit forces may include the tip regularization force described above in reference to method 700, which may act to pull the end of the polyline to a positive pixel representing the endpoint of the tube, as a fine-tuning for the fit curve. In some embodiments, parameters of the attractive force, the elastic force, and/or the curvature force may also be adjusted to generate additional final fit forces. All the nodes, or a plurality of nodes of the polyline may be adjusted in accordance with the final fit forces. The plurality of nodes may be adjusted iteratively as at step 806, over a second predefined number of iterations, which may be different from the first predefined number of iterations.

At 814, method 800 includes determining whether the second predefined number of iterations has been reached. If at 814 it is determined that the second predefined number of iterations has not been reached, method 800 proceeds back to 812, where the final fit forces are recalculated and the nodes of the polyline are adjusted in a next iteration. Alternatively, if at 814 it is determined that the second predefined number of iterations has been reached, method 800 proceeds to 816.

At 816, method 800 includes replacing the binary segmentation mask with a curve based on the polyline, as described above in reference to method 500. Replacing the mask with the polyline may include increasing a width of the polyline. Method 800 ends.

Thus, method 800 represents a hybrid approach between method 500 and method 700 that combines steps of each method to overcome defects in each method. Rather than defining a polyline with a fixed number of points, as in method 700, the polyline is incrementally built up node by node by applying method 500. However, in contrast to method 500, each time a node is added to the polyline, all nodes of the polyline may be adjusted, in accordance with method 700. During this "extend and fit" stage, some of the positive pixels of the mask may not be covered. As a result, a distance limit may be used up to which the positive pixels can exert attractive forces to pull the nodes toward the positive pixels. When an end of the tube is reached (in accordance with method 500) and no more points/nodes are placed, a different set of forces is defined for a "final fit" stage, where the existing nodes are more precisely and tightly pulled to the positive pixels, until the positive pixels are sufficiently covered. By applying the force-based adjustments of method 700 at each addition of a new node, the polyline may be incrementally constructed along a trajectory of the positive pixels with a precision that increases a performance of the algorithm of method 500 at navigating loops and other complicated configurations of the medical tube. At the same time, the incremental addition of nodes in accordance with method 500 resolves the difficulties caused in detecting the loops and other complicated configuration when applying forces to a polyline of a predetermined length. In this way, a single algorithm that exploits the advantages of both of method 500 and method 700 is provided that can generate a representation of the medical tube based on positive pixels in a variety of configurations, including loops. The representation may have more precise borders than an alternative representation generated from the positive pixels without using any of methods 500, 700, or 800.

Additionally, an advantage of the representation of the medical tube generated by following method 800 is that a location of the tube may be saved as a set of coordinate points, where each coordinate point corresponds to a node of the polyline, rather than as a collection of positive pixels. Storing the representation as a set of coordinates reduces an amount of memory consumed by the representation, and may allow a software application used to display the medical tube greater flexibility in how the medical tube is displayed. The coordinates may reduce an amount of computation performed by the software application to display the medical tube in the x-ray image. By reducing the amount of computation, a combined display of the tube and the x-ray image may be generated more rapidly and with less delay, reducing an amount of time during which the x-ray imaging system is used to view patient images, and increasing a number of patients that may be scanned using the x-ray imaging system. Further, measurements of the medical tube and/or sections of the medical tube may be made more rapidly and efficiently when the tube is represented as the set of coordinates than when the tube is represented by the collection of positive pixels, by calculating a sum of distances between the stored coordinates. In an alternate scenario where the tube is represented by the collection of positive pixels, the tube may be measured by calculating a total area occupied by the collection of positive pixels, which may rely on a greater amount of processing. Thus, the amount of computation performed by the tube-tracing algorithm may be further reduced, further increasing the performance and throughput of the x-ray system. The technical effect of fitting a curve to positive pixels of a binary segmentation mask representing a medical tube is that a representation of the medical tube may be generated that can be stored using less memory, and an amount of processing power consumed in displaying and measuring the medical tube may be reduced.

The disclosure also provides support for a method, comprising: receiving a binary segmentation mask of an X-ray image, the binary segmentation mask including a set of positive pixels corresponding to a location of a medical tube in the X-ray image, and a set of negative pixels corresponding to portions of the X-ray image not including the medical tube, fitting a curve to the set of positive pixels of the binary segmentation mask, generating a representation of the medical tube based on the curve, and displaying the representation superimposed on the X-ray image on a display device, wherein fitting the curve to the set of positive pixels further comprises: iteratively adding points along a trajectory of the positive pixels in the binary segmentation mask to form a polyline, each point forming a node of the polyline, after each node is added to the polyline, iteratively adjusting a position of each node of the polyline to more precisely align the polyline with the positive pixels based on forces applied to each node. In a first example of the method, iteratively adding points along the trajectory of the positive pixels in the binary segmentation mask to form the polyline further comprises: defining a starting node of the polyline and a trajectory of the medical tube from the binary segmentation mask, and at each iteration of a plurality of iterations of the method: placing a new point of the polyline at a predefined inter-node distance from the starting node along the trajectory, defining a rectangular pixel search area of the binary segmentation mask centered at the new point and perpendicular to the trajectory, detecting a subset of positive pixels located within the rectangular pixel search area, adding a new node to the polyline at a location of a center of mass of the subset of positive pixels, and redefining the trajectory for adding a next node along a line segment formed between the new node and a previous node of the polyline. In a second example of the method, optionally including the first example, the method further comprises: at each iteration of the plurality of iterations: defining a first boundary check point within the rectangular pixel search area at a predefined boundary distance from a first side of the positive pixels, and a second boundary check point within the rectangular pixel search area at the predefined boundary distance from a second side of the positive pixels, connecting the first boundary check point with a preceding boundary check point at first side of the positive pixels to form a first check line, and connecting the second boundary check point with a preceding boundary check point at the second side of the positive pixels to form a second check line, detecting a positive pixel at one of the first check line and the second check line, and in response, increasing the predefined inter-node distance. In a third example of the method, optionally including one or both of the first and second examples, the method further comprises: in response to not detecting any positive pixels in the rectangular pixel search area: defining a circular pixel search area of the binary segmentation mask centered around a last node of the polyline, in response to detecting positive pixels within the circular pixel search area, adding a new node to the polyline at a location of the center of mass of the detected positive pixels, in response to not detecting any positive pixels within the circular pixel search area, increasing a diameter of the circular pixel search area, and in response to not detecting any positive pixels within the circular pixel search area at the increased diameter, indicating an end of the medical tube. In a fourth example of the method, optionally including one or more or each of the first through third examples, iteratively adjusting the position of each node of the polyline to more precisely align the polyline with the positive pixels based on the forces applied to each node further comprises: for each node of the polyline, minimizing a sum of distances of the node to a plurality of positive pixels, and adjusting the position of the node by a distance and a direction based on a curvature force applied orthogonally to the node in a direction of the positive pixels, the curvature force based on a derivative of the result of the minimization of the sum of the distances. In a fifth example of the method, optionally including one or more or each of the first through fourth examples, a magnitude of the curvature force is calculated using a sigmoid function. In a sixth example of the method, optionally including one or more or each of the first through fifth examples, the method further comprises: adjusting the position of the node based on an elastic force applied to the node, the elastic force calculated as a function of a distance between the node and neighboring node of the polyline, such that in a first condition where the distance between the node and the neighboring node is greater than a predefined distance, the clastic force is an attractive force that pulls the node closer to the neighboring node, and in a second condition where the distance between the node and the neighboring node is less than the predefined distance, the clastic force is a repelling force that pushes the node away from the neighboring node. In a seventh example of the method, optionally including one or more or each of the first through sixth examples, a first component of the clastic force is calculated as a function of a first distance between the node and a previous node of the polyline, and a second component of the elastic force is calculated as a function of a second distance between the node and a subsequent node of the polyline. In a eighth example of the method, optionally including one or more or each of the first through seventh examples, the method further comprises: after a last node is added to the polyline, adjusting the positions of a plurality of nodes of the polyline based on an additional force that acts to pull an end of the polyline to a positive pixel representing an endpoint of the medical tube. In a ninth example of the method, optionally including one or more or each of the first through eighth examples, the method further comprises: calculating a length of a portion of the medical tube by adding lengths of line segments of the polyline between nodes included in the portion. In a tenth example of the method, optionally including one or more or each of the first through ninth examples, the method further comprises: storing the representation of the medical tube in a memory as a set of coordinate points, each coordinate point corresponding to a node of the polyline. In a eleventh example of the method, optionally including one or more or each of the first through tenth examples, the method further comprises: calculating a length of a portion of the medical tube by adding distances calculated between coordinate points included in the portion. In a twelfth example of the method, optionally including one or more or each of the first through eleventh examples, generating the representation of the medical tube based on the curve further comprises one of drawing the medical tube centered on the polyline with a fixed thickness, or including a graphical design of the medical tube centered on the polyline. In a thirteenth example of the method, optionally including one or more or each of the first through twelfth examples, the set of positive pixels indicates a loop in the medical tube, and as a result of performing the method, the representation of the medical tube generated by the polyline precisely aligns the positive pixels.

The disclosure also provides support for an X-ray imaging system, comprising: a processor, and a memory storing instructions that when executed, cause the processor to: receive a binary segmentation mask of an X-ray image, the binary segmentation mask including a set of positive pixels corresponding to a location of a medical tube in the X-ray image, and a set of negative pixels corresponding to portions of the X-ray image not including the medical tube, iteratively add points along a trajectory of the positive pixels in the binary segmentation mask to form a polyline, each point forming a node of the polyline, after each node is added to the polyline, iteratively adjust a position of each node of the polyline to more precisely align the polyline with the positive pixels based on forces applied to each node, generate a representation of the medical tube based on the polyline, and display the representation superimposed on the X-ray image on a display device and/or store the representation as a set of coordinate points, each coordinate point corresponding to a node of the polyline. In a first example of the system, further instructions are stored in the memory that when executed, cause the processor to: define a starting node of the polyline and a trajectory of the medical tube from the binary segmentation mask, and at each iteration of a plurality of iterations: place a new point of the polyline at a predefined inter-node distance from the starting node along the trajectory, define a rectangular pixel search area of the binary segmentation mask centered at the new point and perpendicular to the trajectory, detect a subset of positive pixels located within the rectangular pixel search area, add a new node to the polyline at a location of a center of mass of the subset of positive pixels, and redefine the trajectory along a line segment formed between the new node and a previous node of the polyline. In a second example of the system, optionally including the first example, further instructions are stored in the memory that when executed, cause the processor to: for each node of the polyline, minimize a sum of distances of the node to all positive pixels of the set of positive pixels, and adjust the position of the node by a distance and a direction calculated based on a curvature force and an elastic force applied to the node, wherein the curvature force is based on a derivative of the result of the minimization of the sum of the distances and applied orthogonally to the node in a direction of the positive pixels, and the elastic force is calculated as a function of a first distance between the node and a previous node of the polyline, and a second distance between the node and a subsequent node of the polyline, and is applied in a direction of either the previous node or the subsequent node. In a third example of the system, optionally including one or both of the first and second examples, further instructions are stored in the memory that when executed, cause the processor to calculate a length of a portion of the medical tube by one of adding lengths of line segments of the polyline between nodes included in the portion or calculating a distance between coordinate points included in the portion.

The disclosure also provides support for a computer-implemented method for fitting a polyline to a set of pixels of an image corresponding to a tube in the image, the method comprising: starting with a single node, iteratively adding nodes of the polyline to extend the polyline along a trajectory of the pixels in the image, after adding each node, iteratively adjusting a position of each node of the polyline to more precisely align the polyline with the pixels, by minimizing a sum of distances of the node to all positive pixels of the set of positive pixels, and adjusting the position of the node towards the positive pixels by a distance and a direction calculated based on a curvature force and an elastic force applied to the node, wherein the curvature force is based on a derivative of a result of the minimization of the sum of the distances and applied orthogonally to the node in a direction of the positive pixels, and the elastic force is calculated as a function of a first distance between the node and a previous node of the polyline, and a second distance between the node and a subsequent node of the polyline, and is applied in a direction of either the previous node or the subsequent node. In a first example of the method, iteratively adding nodes of the polyline to extend the polyline along the trajectory of the pixels further comprises: defining a starting node of the polyline at a beginning of a trajectory of the tube, and at each iteration of a plurality of iterations of the method: placing a new point of the polyline at a predefined inter-node distance from the starting node along the trajectory, defining a rectangular pixel search area centered at the new point and perpendicular to the trajectory, detecting a subset of pixels located within the rectangular pixel search area, adding a new node to the polyline at a location of a center of mass of the subset of pixels, and redefining the trajectory for adding a subsequent node along a line segment formed between the new node and a previous node of the polyline.

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:

receiving a binary segmentation mask of an X-ray image, the binary segmentation mask including a set of positive pixels corresponding to a location of a medical tube in the X-ray image, and a set of negative pixels corresponding to portions of the X-ray image not including the medical tube;

iteratively adding points along a trajectory of the positive pixels in the binary segmentation mask to form a polyline, each point forming a node of the polyline;

generating a representation of the medical tube based on the polyline; and displaying the representation superimposed on the X-ray image on a display device;

wherein the medical tube is a medically placed tube inserted into a body of a subject of the X-ray image.

2. The method of claim 1, wherein iteratively adding points along the trajectory of the positive pixels in the binary segmentation mask to form the polyline further comprises:

defining a starting node of the polyline and a trajectory of the medical tube from the binary segmentation mask; and at each iteration of a plurality of iterations of the method:

placing a new point of the polyline at a predefined inter-node distance from the starting node along the trajectory;

defining a pixel search area of the binary segmentation mask centered at the new point;

detecting a subset of positive pixels located within the pixel search area;

adding a new node to the polyline at a location of a center of mass of the subset of positive pixels; and redefining the trajectory for adding a next node along a line segment formed between the new node and a previous node of the polyline.

3. The method of claim 2, wherein the pixel search area is a rectangular pixel area aligned perpendicular to the trajectory.

4. The method of claim 2, further comprising:

at each iteration of the plurality of iterations:

defining a first boundary check point within the pixel search area at a predefined boundary distance on a first side of the line segment, and a second boundary check point within the pixel search area at the predefined boundary distance on a second side of the line segment;

connecting the first boundary check point with a preceding boundary check point at first side of the positive pixels to form a first check line, and connecting the second boundary check point with a preceding boundary check point at the second side of the positive pixels to form a second check line;

detecting a positive pixel at one of the first check line and the second check line, and in response, increasing the predefined inter-node distance.

5. The method of claim 2, further comprising:

in response to not detecting any positive pixels in the pixel search area:

defining a circular pixel search area of the binary segmentation mask centered around a last node of the polyline;

in response to detecting positive pixels within the circular pixel search area, adding a new node to the polyline at a location of the center of mass of the detected positive pixels;

in response to not detecting any positive pixels within the circular pixel search area, increasing a diameter of the circular pixel search area; and in response to not detecting any positive pixels within the circular pixel search area at the increased diameter, indicating an end of the medical tube.

6. The method of claim 1, further comprising:

prior to generating the representation of the medical tube, iteratively adjusting a position of each node of the polyline based on forces applied to each node to more precisely align the polyline with the positive pixels, the forces including at least:

an attractive force applied in a direction of a closest point of the positive pixels of the binary segmentation mask, a magnitude of the attractive force a function of a distance between the node and the closest point;

an elastic force calculated as a function of a distance between the node and neighboring nodes of the polyline, the elastic force having a first component calculated as a function of a first distance between the node and a previous node of the polyline, and a second component calculated as a function of a second distance between the node and a subsequent node of the polyline; and a curvature force calculated as a function of an angle formed between a previous line segment connecting the node to a previous node of the polyline, and a subsequent line segment connecting the node to a subsequent node of the polyline.

7. The method of claim 6, wherein in a first condition where the distance between the node and a neighboring node is greater than a predefined distance, the elastic force is an attractive force that pulls the node closer to the neighboring node, and in a second condition where the distance between the node and the neighboring node is less than the predefined distance, the elastic force is a repelling force that pushes the node away from the neighboring node.

8. The method of claim 6, further comprising iteratively adjusting a position of each node of the polyline after each node is added to the polyline.

9. The method of claim 6, further comprising, after a last node is added to the polyline, adjusting the positions of a plurality of nodes of the polyline based on an additional force that acts to pull an end of the polyline to a positive pixel representing an endpoint of the medical tube.

10. The method of claim 1, further comprising calculating a length of a portion of the medical tube by adding lengths of line segments of the polyline between nodes included in the portion.

11. The method of claim 1, further comprising storing the representation of the medical tube in a memory as a set of coordinate points, each coordinate point corresponding to a node of the polyline.

12. The method of claim 11, further comprising calculating a length of a portion of the medical tube by adding distances calculated between coordinate points included in the portion.

13. The method of claim 1, wherein generating the representation of the medical tube based on the polyline further comprises one of drawing the medical tube centered on the polyline with a fixed thickness, or including a graphical design of the medical tube centered on the polyline.

14. The method of claim 1, wherein the set of positive pixels indicates a loop in the medical tube, and as a result of performing the method, the representation of the medical tube generated by the polyline precisely aligns the positive pixels.

15. An X-ray imaging system, comprising:

a processor, and a memory storing instructions that when executed, cause the processor to:

receive a binary segmentation mask of an X-ray image, the binary segmentation mask including a set of positive pixels corresponding to a location of a medical tube in the X-ray image, and a set of negative pixels corresponding to portions of the X-ray image not including the medical tube;

iteratively add points along a trajectory of the positive pixels in the binary segmentation mask to form a polyline, each point forming a node of the polyline;

generate a representation of the medical tube based on the polyline; and display the representation superimposed on the X-ray image on a display device and/or store the representation as a set of coordinate points, each coordinate point corresponding to a node of the polyline;

wherein the medical tube is a medically placed tube inserted into a body of a subject of the X-ray image.

16. The X-ray imaging system of claim 15, wherein further instructions are stored in the memory that when executed, cause the processor to:

define a starting node of the polyline and a trajectory of the medical tube from the binary segmentation mask; and at each iteration of a plurality of iterations:

place a new point of the polyline at a predefined inter-node distance from the starting node along the trajectory;

define a rectangular pixel search area of the binary segmentation mask centered at the new point and perpendicular to the trajectory;

detect a subset of positive pixels located within the rectangular pixel search area;

add a new node to the polyline at a location of a center of mass of the subset of positive pixels; and redefine the trajectory along a line segment formed between the new node and a previous node of the polyline.

17. The X-ray imaging system of claim 15, wherein further instructions are stored in the memory that when executed, cause the processor to:

for each node of the polyline, determine a closest positive pixel by minimizing a sum of distances of the node to all positive pixels of the set of positive pixels;

adjust a position of the node based on applying an attractive force to the node in a direction of the closest positive pixel, a magnitude of the attractive force based on a distance to the closest positive pixel; and further adjust the position of the node by applying a curvature force to the node, the curvature force based on an angle between a previous line segment of the node and a subsequent line segment of the node; and further adjust the position of the node by applying an elastic force calculated as a function of a first distance between the node and a previous node of the polyline, and a second distance between the node and a subsequent node of the polyline, the elastic force applied in a direction of either the previous node or the subsequent node.

18. The X-ray imaging system of claim 15, wherein further instructions are stored in the memory that when executed, cause the processor to calculate a length of a portion of the medical tube by one of adding lengths of line segments of the polyline between nodes included in the portion or calculating a distance between coordinate points included in the portion.

19. A computer-implemented method for fitting a polyline to a set of pixels of an image corresponding to a tube in the image, the method comprising:

starting with a single node, iteratively adding nodes of the polyline to extend the polyline along a trajectory of the pixels in the image;

after adding each node, iteratively adjusting a position of each node of the polyline to more precisely align the polyline with the pixels, by applying an attractive force to the node in a direction of a closest pixel of the set of pixels, a magnitude of the attractive force based on a distance to the closest pixel, the closest pixel determined by minimizing a sum of distances of the node to all pixels of the set of pixels, and further adjusting the position of the node by a distance and a direction calculated based on a curvature force and an elastic force applied to the node;

wherein the curvature force is based on an angle between a first line segment of the polyline ending at the node and a second line segment beginning at the node, and the elastic force is calculated as a function of a first distance between the node and a previous node of the polyline, and a second distance between the node and a subsequent node of the polyline, and is applied in a direction of either the previous node or the subsequent node.

20. The computer-implemented method of claim 19, wherein iteratively adding nodes of the polyline to extend the polyline along the trajectory of the pixels further comprises:

defining a starting node of the polyline at a beginning of a trajectory of the tube; and at each iteration of a plurality of iterations of the method:

placing a new point of the polyline at a predefined inter-node distance from the starting node along the trajectory;

defining a rectangular pixel search area centered at the new point and perpendicular to the trajectory;

detecting a subset of pixels located within the rectangular pixel search area;

adding a new node to the polyline at a location of a center of mass of the subset of pixels; and redefining the trajectory for adding a subsequent node along a line segment formed between the new node and a previous node of the polyline.

* * * * *